United States Patent
Hayakawa et al.

(10) Patent No.: US 9,558,546 B2
(45) Date of Patent: Jan. 31, 2017

(54) THREE-DIMENSIONAL OBJECT DETECTION DEVICE, AND THREE-DIMENSIONAL OBJECT DETECTION METHOD

(71) Applicants: Nissan Motor Co., Ltd., Yokohama-shi, Kanagawa (JP); Clarion Co., Ltd., Saitama-shi, Saitama (JP)

(72) Inventors: Yasuhisa Hayakawa, Yokohama (JP); Osamu Fukata, Commerce Township, MI (US); Masayuki Takemura, Hitachi (JP); Akira Utagawa, Hitachinaka (JP); Shoji Muramatsu, Hitachi (JP); Kota Irie, Sagamihara (JP)

(73) Assignees: Nissan Motor Co., Ltd., Yokohama (JP); Clarion Co., Ltd., Saitama (JP)

( * ) Notice: Subject to any disclaimer, the term of this patent is extended or adjusted under 35 U.S.C. 154(b) by 281 days.

(21) Appl. No.: 14/410,730

(22) PCT Filed: Jul. 26, 2013

(86) PCT No.: PCT/JP2013/070308
§ 371 (c)(1),
(2) Date: Dec. 23, 2014

(87) PCT Pub. No.: WO2014/017624
PCT Pub. Date: Jan. 30, 2014

(65) Prior Publication Data
US 2015/0324972 A1    Nov. 12, 2015

(30) Foreign Application Priority Data

Jul. 27, 2012  (JP) ................................. 2012-166527

(51) Int. Cl.
*H04N 9/80*    (2006.01)
*H04N 5/76*    (2006.01)
(Continued)

(52) U.S. Cl.
CPC ......... *G06T 7/0008* (2013.01); *G06K 9/00201* (2013.01); *G06K 9/00771* (2013.01);
(Continued)

(58) Field of Classification Search
CPC .............. H04N 9/80; H04N 5/76; H04N 9/70; H04N 5/92; H04N 5/93; H04N 9/797; H04N 9/835; H04N 9/07; H04N 1/407
(Continued)

(56) References Cited

U.S. PATENT DOCUMENTS 6,137,531 A * 10/2000 Kanzaki ............. B60K 31/0008
                                                         348/149
8,854,456 B2 * 10/2014 Tsuchiya ................. G01S 11/12
                                                         348/135
9,319,647 B2 *  4/2016 Kanou ..................... H04N 9/07

FOREIGN PATENT DOCUMENTS

EP       2400315 A1    12/2011
JP    2006-311216 A    11/2006
(Continued)

OTHER PUBLICATIONS

Kim et al., "An Intelligent and Integrated Driver Assistance System for Increased Safety and Convenience Based on All-around Sensing", Journal of Intelligent and Robotic Systems, Oct. 2007, pp. 261-287, vol. 51, Kluwer Academic Publishers, Netherlands.

*Primary Examiner* — Daquan Zhao
(74) *Attorney, Agent, or Firm* — Global IP Counselors, LLP

(57) ABSTRACT

A three-dimensional object detection device has an image capturing unit, an object detection unit, a nighttime assessment unit, a luminance detection unit, a luminance peak detection unit and a controller. The image capturing unit captures images rearward of a vehicle. The object detection unit detects a presence of an object from the captured
(Continued)

images. The nighttime assessment unit assesses if nighttime has fallen. The luminance detection unit detects a luminance of image areas from the captured image. The luminance peak detection unit detects a peak in the luminance having a luminance gradient that is greater than or equal to a predetermined reference value from among the detected peaks in the luminance as a target luminance peak. The controller controls detection of the object in an image area in which the target luminance peak is detected when an assessment has been made that nighttime has fallen by the nighttime assessment unit.

19 Claims, 28 Drawing Sheets

(51) Int. Cl.
| | |
|---|---|
| H04N 9/70 | (2006.01) |
| H04N 5/92 | (2006.01) |
| H04N 5/93 | (2006.01) |
| G06T 7/00 | (2006.01) |
| G06T 17/00 | (2006.01) |
| G06K 9/00 | (2006.01) |
| H04N 7/18 | (2006.01) |
| H04N 9/797 | (2006.01) |
| H04N 9/835 | (2006.01) |
| H04N 9/07 | (2006.01) |
| H04N 1/407 | (2006.01) |

(52) U.S. Cl.
CPC ........ G06K 9/00805 (2013.01); G06T 7/0083 (2013.01); G06T 17/00 (2013.01); H04N 7/183 (2013.01); *G06T 2200/04* (2013.01); *G06T 2207/10004* (2013.01); *G06T 2207/10152* (2013.01); *G06T 2207/20148* (2013.01); *G06T 2207/20224* (2013.01); *G06T 2207/30232* (2013.01); *G06T 2207/30252* (2013.01); *G06T 2207/30261* (2013.01)

(58) Field of Classification Search
USPC ................ 386/300, 307, 308, 311, 312, 291, 326,386/353; 348/254, 255, 276, 222.1
See application file for complete search history.

(56) References Cited

FOREIGN PATENT DOCUMENTS

| | | |
|---|---|---|
| JP | 2007-265016 A | 10/2007 |
| JP | 2008-219063 A | 9/2008 |
| JP | 2009-65360 A | 3/2009 |
| JP | 2012-048643 A | 3/2012 |
| KR | 2008-0004833 A | 1/2008 |

* cited by examiner

| NUMBER OF SPECIFIC LUMINANCE PEAKS | MAGNITUDE OF LUMINANCE VALUE OF SPECIFIC LUMINANCE PEAKS | CONTROL METHOD |
|---|---|---|
| EQUAL TO OR GREATER THAN A FIRST ASSESSMENT NUMBER LESS THAN A SECOND ASSESSMENT NUMBER | HIGH LUMINANCE | INCREASE DIFFERENTIAL THRESHOLD VALUE (CHANGE AMOUNT LARGE) |
| | MEDIUM LUMINANCE | INCREASE DIFFERENTIAL THRESHOLD VALUE (CHANGE AMOUNT LITTLE) |
| EQUAL TO OR GREATER THAN A SECOND ASSESSMENT NUMBER | HIGH LUMINANCE | PROHIBIT THREE-DIMENSIONAL OBJECT DETECTION (PROHIBIT RANGE LARGE) |
| | MEDIUM LUMINANCE | PROHIBIT THREE-DIMENSIONAL OBJECT DETECTION (PROHIBIT RANGE SMALL) |

FIG. 15

THREE-DIMENSIONAL OBJECT
DETECTION DEVICE, AND
THREE-DIMENSIONAL OBJECT
DETECTION METHOD

CROSS-REFERENCE TO RELATED
APPLICATIONS

This application is a U.S. National stage application of International Application No. PCT/JP2013/070308, filed Jul. 26, 2013, which claims priority to Japanese Patent Application No. 2012-166527 filed in Japan on Jul. 27, 2012.

BACKGROUND

Field of the Invention

The present invention relates to a three-dimensional object detection device and a three-dimensional object detection method.

Background Information

In a conventionally known technique, a three-dimensional object near a host vehicle is detected based on a captured image captured by a camera (see Japanese Laid-Open Patent Application No. 2006-311216).

SUMMARY

When a three-dimensional object near a host vehicle is detected based on a captured image captured with a camera at night, there is a problem in that, when water film has formed on the road surface due to rainfall and the like, a light source, such as a street light, could be reflected by the road surface; an image of light, such as the light source that reflects on the road surface, can then be erroneously detected as a three-dimensional object.

The problem to be solved by the present invention is to provide a three-dimensional object detection device that is capable of properly detecting a three-dimensional object.

The present invention solves the problem in a three-dimensional object detection device that detects a three-dimensional object based on a captured image captured by an image capturing unit by detecting the luminance in a plurality of image areas, based on the captured image, detecting, of the detected peaks in the luminance, a peak in the luminance having a luminance gradient of a predetermined value or more as a target luminance peak and suppressing the detection of a three-dimensional object based on the detection result of the target luminance peak during the nighttime.

According to the present invention, effectively preventing an erroneous detection of a light source, such as a street light reflected on the road surface, as a three-dimensional object by suppressing the detection of a three-dimensional object based on a specific luminance peak caused by a light source, such as a street light reflected on the road surface, is possible.

BRIEF DESCRIPTION OF THE DRAWINGS

Referring now to the attached drawings which form a part of this original disclosure.

FIG. 15 is a view showing the control method for three-dimensional object detection based on a specific luminance peak.

DETAILED DESCRIPTION OF THE EMBODIMENTS

Embodiment 1

Figure 1:
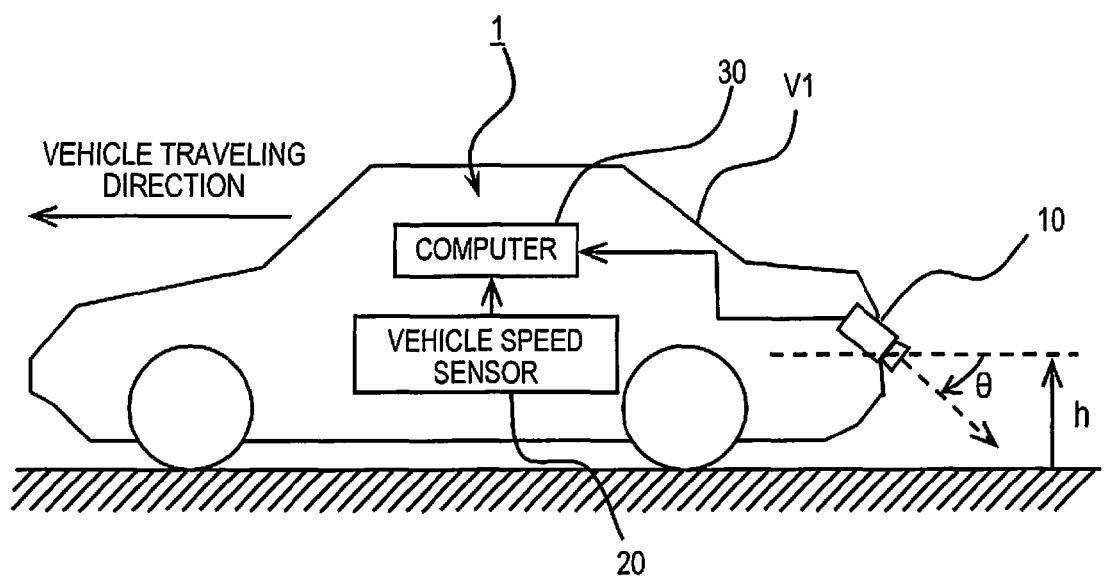
FIG. 1 is a schematic overview of a vehicle equipped with a three-dimensional object detection device.

FIG. 1 is a schematic overview of a vehicle equipped with a three-dimensional object detection device 1 according to the present embodiment. An object of the three-dimensional object detection device 1 according to the present embodiment is to detect a three-dimensional object (three-dimensional objects such as an adjacent vehicle V2) present in an adjacent lane where contact is possible should a host vehicle V1 change lanes. The three-dimensional object detection device 1 according to the present embodiment is provided with a camera 10, a vehicle speed sensor 20, and a computer 30, as illustrated in FIG. 1.

The camera 10 is attached to the host vehicle V1 so that the optical axis is an angle θ downward from the horizontal in a location at a height h at the rear of the host vehicle V1, as illustrated in FIG. 1. From this position, the camera 10 captures a predetermined area of the surrounding environment of the host vehicle V1. The vehicle speed sensor 20 detects the driving speed of the host vehicle V1 and calculates the vehicle speed from a wheel speed detected by, for example, a wheel speed sensor for detecting the rotational speed of a wheel. The computer 30 detects an adjacent vehicle present in an adjacent lane rearward of the host vehicle.

Figure 2:
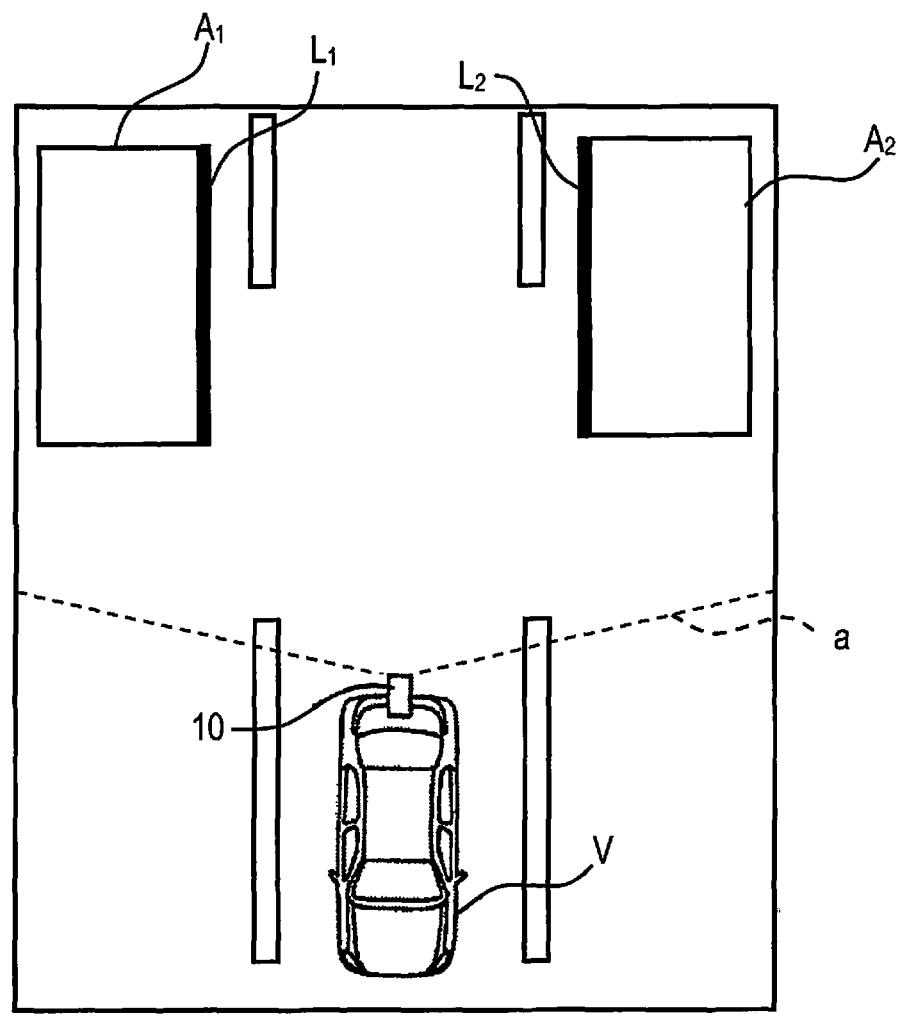
FIG. 2 is a plan view illustrating a driving state of the vehicle in FIG. 1.

FIG. 2 is a plan view illustrating the driving state of the host vehicle V1 in FIG. 1. As illustrated in the drawing, the camera 10 captures the rearward side of the vehicle at a predetermined view angle a. At this time, the view angle a of the camera 10 is set to a view angle that allows the left and right lanes (the adjacent lanes) to be captured in addition to the lane in which the host vehicle V1 is driving.

Figure 3:
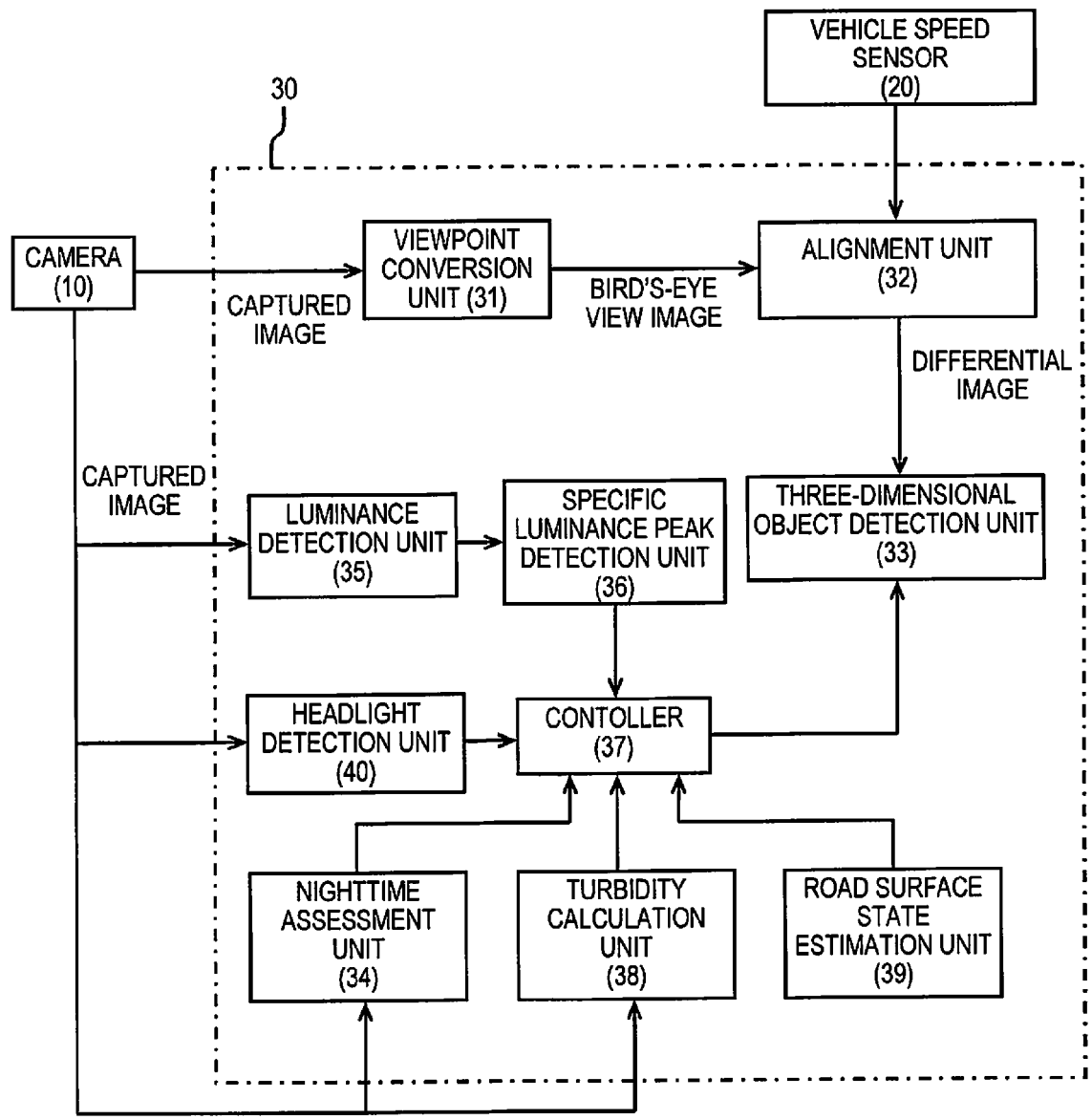
FIG. 3 is a block view illustrating the details of a computer.

FIG. 3 is a block view illustrating the details of the computer 30 according to the first embodiment. The camera 10 and the vehicle speed sensor 20 are also illustrated in FIG. 3 in order to distinctly indicate the connection relationships.

As illustrated in FIG. 3, the computer 30 is provided with a viewpoint conversion unit 31, an alignment unit 32, a three-dimensional object detection unit 33, a nighttime assessment unit 34, a luminance detection unit 35, a specific luminance peak detection unit 36, a controller 37, a turbidity calculation unit 38, a road surface state estimation unit 39, and a headlight detection unit 40. The configurations of these units are described below.

Captured image data of the predetermined area obtained by the camera 10 is input into the viewpoint conversion unit 31, and the captured image data thus input is converted to bird's-eye view image data, which is a bird's-eye view state. A bird's-eye view state is a state of viewing from a viewpoint of an imaginary camera that is looking down from above, in particular, vertically downward. Viewpoint conversion can be carried out in the manner described in, for example, Japanese Laid-Open Patent Application No. 2008-219063. The reason that captured image data is converted to bird's-eye view image data is based on the principle that perpendicular edges unique to a three-dimensional object are converted into a straight-line group that passes through a specific fixed point by viewpoint conversion into bird's-eye view image data; utilizing this principle allows a planar object to be differentiated from a three-dimensional object.

Figure 4:
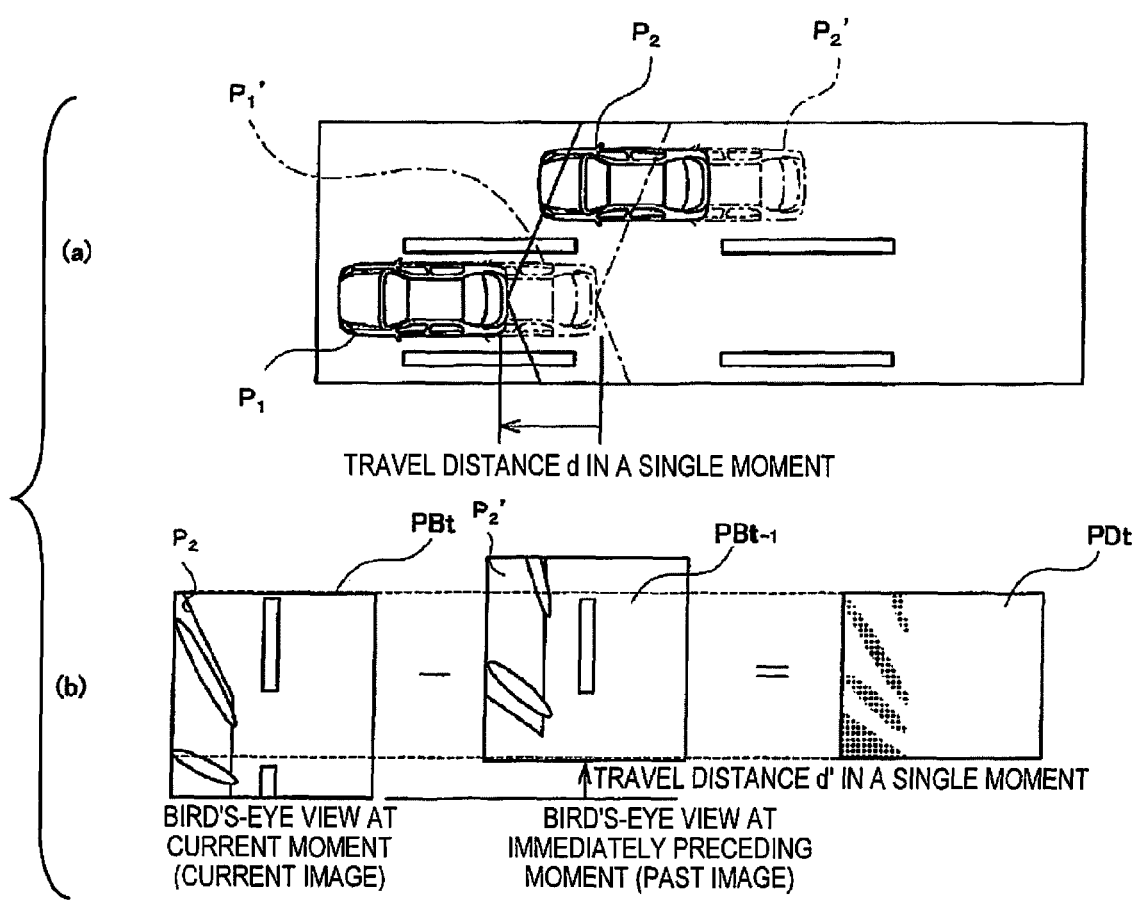
FIG. 4 is a view showing a general overview of the processing of an alignment unit, with part (a) of FIG. 4 being a plan view illustrating the movement state of the vehicle, and part (b) of FIG. 4 being an image illustrating a general overview of the alignment.

The bird's-eye view image data obtained by viewpoint conversion, which is carried out by the viewpoint conversion unit 31, is sequentially input into the alignment unit 32, and the input positions of the bird's-eye view image data at different times are aligned. FIG. 4 is a view showing a general overview of the processing of the alignment unit 32, with part (a) of FIG. 4 being a plan view illustrating the movement state of the host vehicle V1 and part (b) of FIG. 4 being an image illustrating a general overview of the alignment.

As illustrated in part (a) of FIG. 4, the host vehicle V1 at the current moment is positioned at $P_1$, and the host vehicle V1 at a single moment prior is positioned at $P_1'$. An assumption is made that an adjacent vehicle V2 is positioned at the rear of the host vehicle V1 and is driving parallel to the host vehicle V1, as well as that the adjacent vehicle V2 at the current moment is positioned at $P_2$ and that the adjacent vehicle V2 at a single moment prior is positioned at $P_2'$. Also, an assumption is made that the host vehicle V1 has moved a distance d in a single moment. The phrase "at a single moment prior" may be a moment in the past by a time set in advance (e.g., a single control cycle) from the current moment; this may also be a moment in the past at an arbitrary time.

In such a state, a bird's-eye view image $PB_t$ at the current moment is illustrated in part (b) of FIG. 4. The white lines drawn on the road surface are rectangular in this bird's-eye view image $PB_t$ and are relatively accurate in a planar view, but the adjacent vehicle V2 (position $P_2$) is collapsed. The same applies to the bird's-eye view image $PB_{t-1}$ at a single moment prior; the white lines drawn on the road surface are rectangular and are relatively accurate in a planar view, but the adjacent vehicle V2 (position $P_2'$) is collapsed. As previously described, the perpendicular edges of a three-dimensional object (the edges that stand erect in three-dimensional space from the road surface are also included in a strict meaning of perpendicular edge) appear as a straight-line group along a collapsing direction due to the process for converting the viewpoint to bird's-eye view image data; however, because a planar image on the road surface does not include perpendicular edges, such collapsing does not occur even when the viewpoint has been converted.

The alignment unit 32 aligns the bird's-eye view images $PB_t$ and $PB_{t-1}$, such as those described above, in terms of data. When this has been carried out, the alignment unit 32 offsets the bird's-eye view image $PB_{t-1}$ at a single moment prior and matches the position with the bird's-eye view image $PB_t$ at the current moment. The left-side image and the center image in part (b) of FIG. 4 illustrate the offset state by a traveling distance d'. The offset amount d' is the amount of movement in the bird's-eye view image data that corresponds to the actual traveling distance d of the host vehicle V1 illustrated in part (a) of FIG. 4; this is decided based on a signal from the vehicle speed sensor 20 and the time from a single moment prior to the current moment.

After alignment, the alignment unit 32 obtains the difference between the bird's-eye view images $PB_t$ and $PB_{t-1}$ and generates difference image data $PD_t$. In the present embodiment, the alignment unit 32 takes the absolute value of the difference in the pixel values of the bird's-eye view images $PB_t$ and $PB_{t-1}$ in order to correspond to a variation in the illumination environment; when the absolute value is equal to or greater than a predetermined threshold value th, the pixel values of the difference image $PD_t$ are set to "1;" when the absolute value is less than a predetermined threshold value th, the pixel values of the difference image $PD_t$ are set to "0," which allows difference image $PD_t$ data such as that illustrated on the right side of part (b) of FIG. 4 to be generated. In the present embodiment, there are cases in which the value of the differential threshold value th is changed by the controller 37 mentioned below; when the differential threshold value th is changed by the controller 37, the pixel values of the difference image $PD_t$ are detected using the differential threshold value th that is changed by the controller 37.

The alignment unit 32 in the present embodiment aligns in a bird's-eye view the positions of the bird's-eye view images obtained at different times and obtains the aligned bird's-eye view images; however, the "alignment" process may be carried out at a precision corresponding to the type of objects to be detected or to the required precision for detection. For example, the process may be a strict alignment process in which alignment is conducted based on the same time and same position or a loose alignment in which the coordinates of each bird's-eye view image are obtained.

The three-dimensional object detection unit 33 then detects a differential waveform based on the difference image $PD_t$ data illustrated in part (b) of FIG. 4. In this case, the three-dimensional object detection unit 33 calculates the traveling distance of the three-dimensional object in real space. The three-dimensional object detection unit 33 first generates a first differential waveform when the three-dimensional object is detected and the traveling distance is to be calculated.

In generating the differential waveform, the three-dimensional object detection unit 33 sets a detection area (a detection frame) in the difference image $PD_t$. An object of the three-dimensional object detection device 1 of the present example is to calculate the traveling distance for the adjacent vehicle with which there is a possibility of contact should the host vehicle V1 change lanes. Accordingly, in the present example, rectangular detection areas (the detection frames) A1, A2 are set behind the host vehicle V1, as illustrated in FIG. 2. Such detection areas A1, A2 may be set from a relative position to the host vehicle V1, or they may be set based on the position of the white lines. When set based on the position of the white lines, the three-dimensional object detection device 1 may use, for example, what is known as white line recognition techniques.

The three-dimensional object detection unit 33 recognizes as ground lines L1, L2 the borders of the detection areas A1, A2 thus set on the host vehicle V1 side (the side along the driving direction), as illustrated in FIG. 2. Generally, a ground line refers to a line in which a three-dimensional object is in contact with the ground; however, in the present embodiment, a ground line is not a line in contact with the ground but is, rather, set in the manner described above. Even in such a case, the difference between the ground line according to the present embodiment and the normal ground line determined from the position of the adjacent vehicle V2 is not exceedingly great as determined by experience, and there is no problem in actuality.

Figure 5:
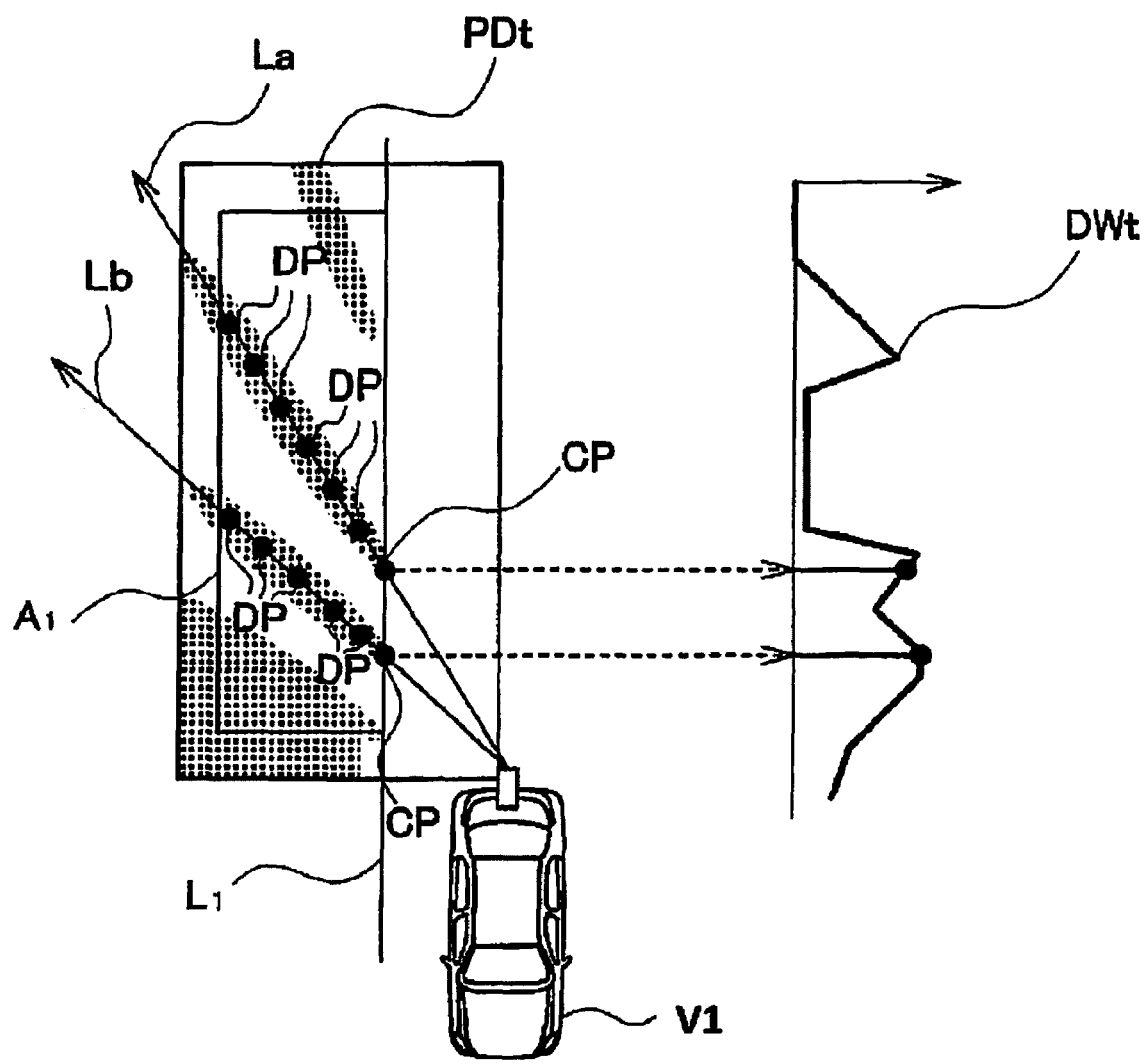
FIG. 5 is a schematic view illustrating the manner in which a differential waveform is generated by the three-dimensional object detection unit.

FIG. 5 is a schematic view illustrating the manner in which a differential waveform is generated by the three-dimensional object detection unit 33. As illustrated in FIG. 5, the three-dimensional object detection unit 33 generates a differential waveform $DW_t$ from the portion that corresponds to the detection areas A1, A2 in the difference image $PD_t$ (the drawing on the right in part (b) of FIG. 4) calculated by the alignment unit 32. In this case, the three-dimensional object detection unit 33 generates differential waveform $DW_t$ along the collapsing direction of the three-dimensional object by viewpoint conversion. In the example illustrated in FIG. 5, only the detection area A1 will be described for the sake of convenience, but the differential waveform $DW_t$ is generated for the detection area A2 as well using the same procedure.

More specifically, first, the three-dimensional object detection unit 33 defines a line La in the direction in which the three-dimensional object collapses the difference image $PD_t$ data. The three-dimensional object detection unit 33 then counts the number of difference pixels DP indicating a predetermined difference on the line La. In the present embodiment, the difference pixels DP indicating a predetermined difference have pixel values in the difference image $PD_t$ that are represented by "0" and "1," and the pixels indicated by "1" are counted as difference pixels DP.

The three-dimensional object detection unit 33 counts the number of difference pixels DP and thereafter determines the crossing point CP of the line La and the ground line L1. The three-dimensional object detection unit 33 then correlates the crossing point CP and the count number and decides the horizontal-axis position, in particular, the position on the axis in the vertical direction in the drawing on the right in FIG. 5, based on the position of the crossing point CP; the three-dimensional object detection unit then decides the vertical-axis position, in particular, the position on the axis in the lateral direction in the drawing, on the right in FIG. 5, from the count number and plots the positions as the count number at the crossing point CP.

Similarly, the three-dimensional object detection unit 33 defines the lines Lb, Lc, . . . in the direction in which the three-dimensional object collapses, counts the number of difference pixels DP, decides the horizontal-axis position based on the position of each crossing point CP, decides the vertical-axis position from the count number (the number of difference pixels DP), and plots the positions. The three-dimensional object detection unit 33 repeats the above in sequence to form a frequency distribution, thereby generating a differential waveform $DW_t$ as illustrated in the drawing on the right in FIG. 5.

Here, the difference pixels PD in the difference image $PD_t$ data are pixels that have changed in the image at different moments; in other words, they are locations that can be construed to be where a three-dimensional object was present. Accordingly, in locations where a three-dimensional object was present, the number of pixels is counted along the direction in which the three-dimensional object collapses to form a frequency distribution, thereby generating a differential waveform $DW_t$. In particular, the number of pixels is counted along the direction in which the three-dimensional object collapses, and a differential waveform $DW_t$ is therefore generated from information about the height direction in relation to the three-dimensional object.

The lines La and Lb in the direction in which the three-dimensional object collapses have different distances that overlap the detection area A1, as illustrated in the drawing on the left in FIG. 5. Accordingly, the number of difference pixels DP is greater on the line La than on the line Lb when an assumption is made that the detection area A1 is filled with the difference pixels DP. For this reason, the three-dimensional object detection unit 33 performs normalization based on the distance that the lines La, Lb in the direction in which the three-dimensional object collapses and the detection area A1 overlap when the vertical-axis position is decided from the count number of the difference pixels DP. In a specific example, there are six difference pixels DP on the line La, and there are five difference pixels DP on the line Lb in the drawing on the left in FIG. 5. Accordingly, when the vertical-axis position is decided from the count number in FIG. 5, the three-dimensional object detection unit 33 divides the count number by the overlapping distance or performs normalization in another manner. The values of the differential waveform $DW_t$ that correspond to the lines La, Lb in the direction in which the three-dimensional object collapses are thereby made substantially the same, as illustrated by the differential waveform $DW_t$.

Figure 6:
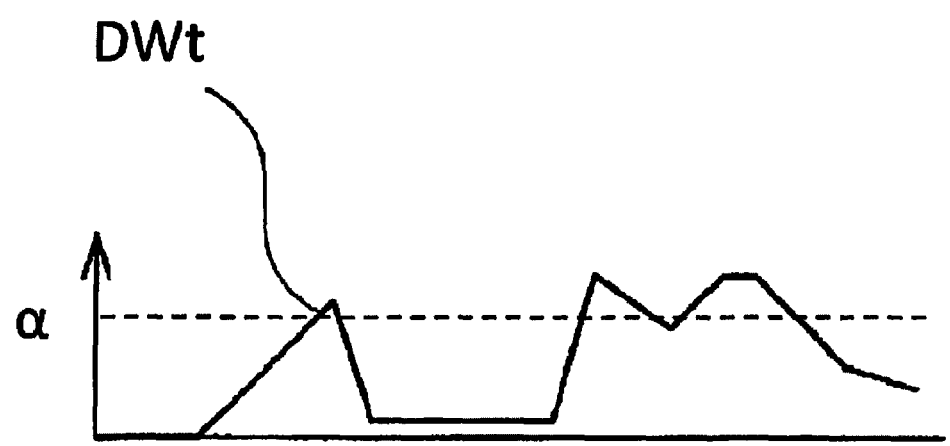
FIG. 6 is a view illustrating an example of the threshold value α for detecting a differential waveform and a three-dimensional object.

After the differential waveform $DW_t$ has been generated, the three-dimensional object detection unit 33 detects an adjacent vehicle that is present in the adjacent lane based on the generated differential waveform $DW_t$. FIG. 6 is a view showing the method for detecting a three-dimensional object by the three-dimensional object detection unit 33 and shows an example of the threshold value α for detecting a differential waveform $DW_t$ and a three-dimensional object. The three-dimensional object detection unit 33 determines whether or not a three-dimensional object is present in the detection areas A1, A2 by determining whether the peak of the generated differential waveform $DW_t$ is at a predetermined threshold value α corresponding to the peak position of the differential waveform $DW_t$ or greater, as illustrated in FIG. 6. The three-dimensional object detection unit 33 then determines that a three-dimensional object is not present in the detection areas A1, A2 when the peak of the differential waveform $DW_t$ is less than the predetermined threshold value α and determines that a three-dimensional object is present in the detection areas A1, A2 when the peak of the differential waveform $DW_t$ is at a predetermined threshold value α or greater.

The three-dimensional object detection unit 33 calculates the traveling speed of the three-dimensional object by comparing the differential waveform $DW_t$ at the current moment with the differential waveform $DW_{t-1}$ at a single moment prior. In other words, the three-dimensional object detection unit 33 calculates the traveling speed of the three-dimensional object from the change in time of the differential waveforms $DW_t$, $DW_{t-1}$. The three-dimensional object detection unit 33 also calculates the relative traveling speed of the host vehicle V1 in relation to the traveling speed of the three-dimensional object.

Figure 7:
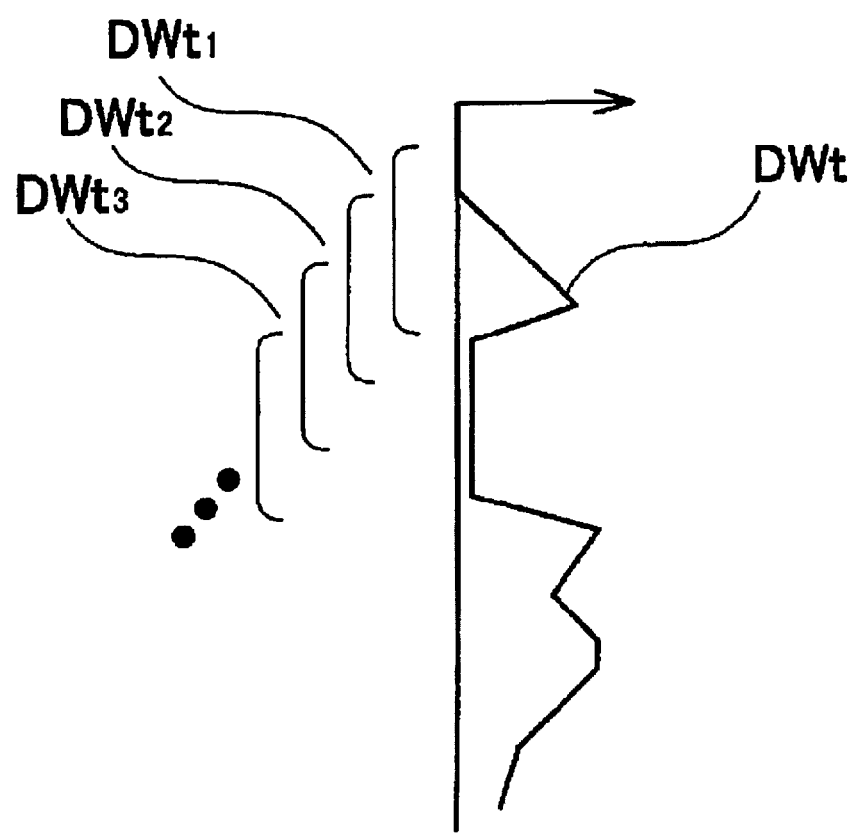
FIG. 7 is a view illustrating the small areas divided by the three-dimensional object detection unit.

More specifically, the three-dimensional object detection unit 33 divides the differential waveform $DW_t$ into a plurality of small areas $DW_{t1}$, to $DW_{tn}$ (where n is an arbitrary integer of 2 or greater), as illustrated in FIG. 7. FIG. 7 is a view illustrating the small areas $DW_{t1}$ to $DW_{tn}$ divided by the three-dimensional object detection unit 33. The small areas $DW_{t1}$ to $DW_{tn}$ are divided so as to be mutually overlapping, as illustrated in, for example, FIG. 7. For example, the small area $DW_{t1}$ and the small area $DW_{t2}$ overlap each other, and the small area $DW_{t2}$ and the small area $DW_{t3}$ overlap each other.

Next, the three-dimensional object detection unit 33 determines the offset amount (the amount of movement in the horizontal-axis direction (the vertical direction in FIG. 7) of the differential waveform) for each of the small areas $DW_{t1}$ to $DW_{tn}$. Here, the offset amount is determined from the difference (the distance in the horizontal-axis direction) between the differential waveform $DW_{t-1}$ at a single moment prior and the differential waveform $DW_t$ at the current moment. In this case, the three-dimensional object detection unit 33 moves the differential waveform $DW_{t-1}$ at a single moment prior in the horizontal-axis direction for each of the small areas $DW_{t1}$ to $DW_{tn}$; then, the three-dimensional object detection unit assesses the position (the position in the horizontal-axis direction) in which the error from the differential waveform $DW_t$ at the current moment is at a minimum and determines as the offset amount the movement amount in the horizontal-axis direction at the position in which the error from the original position of the differential waveform $DW_{t-1}$ is at a minimum. The three-dimensional object detection unit 33 then counts the offset amount determined for each of the small areas $DW_{t1}$ to $DW_{tn}$ and forms a histogram.

Figure 8:
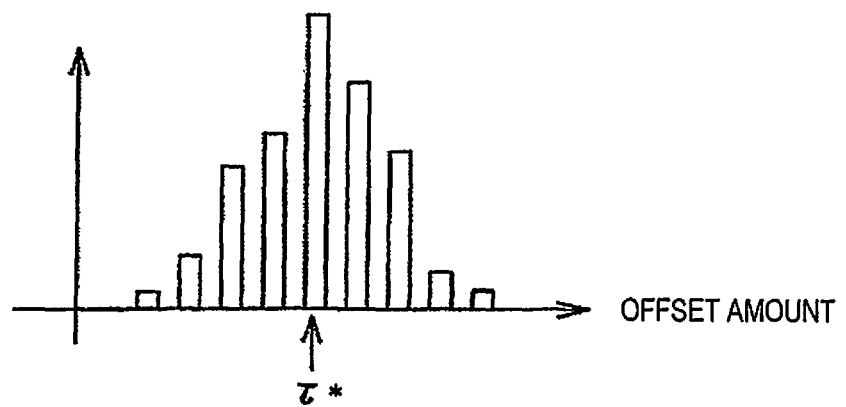
FIG. 8 is a view illustrating an example of the histogram obtained by the three-dimensional object detection unit.

FIG. 8 is a view illustrating an example of the histogram obtained by the three-dimensional object detection unit 33. As illustrated in FIG. 8, some amount of variability occurs in the offset amount, which is the movement amount in which the error between the small areas $DW_{t1}$ to $DW_{tn}$ and the differential waveform $DW_{t-1}$, at a single moment prior is at a minimum. Accordingly, the three-dimensional object detection unit 33 forms the offset amounts including the variability into a histogram and calculates the traveling distance from the histogram. At this point, the three-dimensional object detection unit 33 calculates the traveling distance of the three-dimensional object (the adjacent vehicle V2) from the maximum value in the histogram. In other words, in the example illustrated in FIG. 8, the three-dimensional object detection unit 33 calculates the offset amount indicating the maximum value of the histogram as the traveling distance τ*. In this manner, in the present embodiment, a more highly accurate traveling distance can be calculated from the maximum value, even when there is variability in the offset amount. The traveling distance τ* is the relative traveling distance of the three-dimensional object (the adjacent vehicle V2) in relation to the host vehicle. Accordingly, the three-dimensional object detection unit 33 calculates the absolute traveling distance based on the traveling distance τ* thus obtained and from the vehicle speed sensor 20 when the absolute traveling distance is to be calculated.

In this manner, in the present embodiment, the traveling distance of the three-dimensional object (the adjacent vehicle V2) is calculated from the offset amount of the differential waveform $DW_t$ when the error in the differential waveform $DW_t$ generated at different moments is at a minimum; this allows the traveling distance to be calculated from the offset amount, which is information about one dimension in a waveform, and allows the computation costs to be kept low when the traveling distance is calculated. Also, dividing the differential waveform $DW_t$ generated at different moments into a plurality of small areas $DW_{t1}$ to $DW_{tn}$ allows a plurality of waveforms representing the locations of the three-dimensional object to be obtained, thereby allowing the offset amount at each location of the three-dimensional object to be determined and allowing the traveling distance to be determined from a plurality of offset amounts. Therefore, the precision of the calculation of the traveling distance can be improved. In the present embodiment, the traveling distance of the three-dimensional object is calculated from the change in time of the differential waveform $DW_t$, which includes the height direction information. Consequently, in contrast to the focus being solely on the movement of a single point, the detection location prior to a change in time and the detection location after a change in time are specified with the height direction information included and accordingly readily end up being the same location; the traveling distance is calculated from the change in time at the same location; and the precision of the calculation of the traveling distance can be improved.

Figure 9:
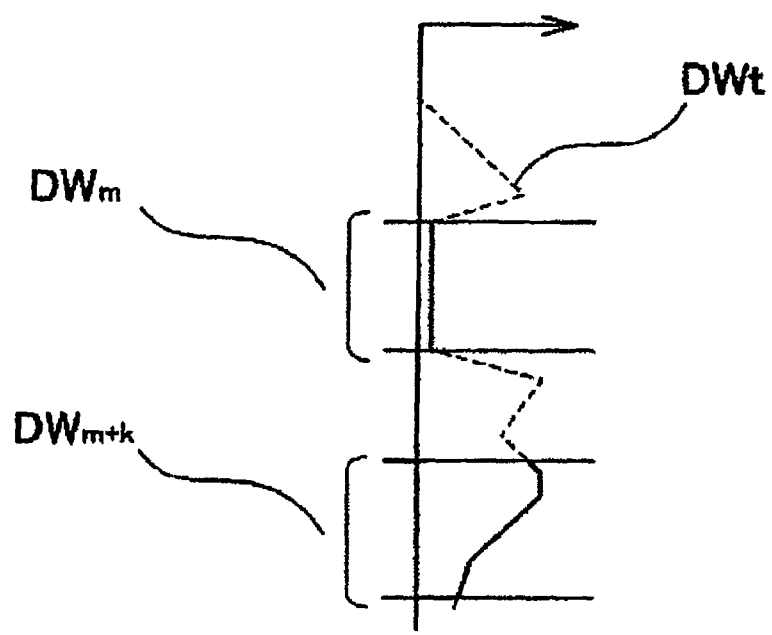
FIG. 9 is a view illustrating the weights used by the three-dimensional object detection unit.

When a histogram is to be formed, the three-dimensional object detection unit 33 may weight a plurality of small areas $DW_{t1}$ to $DW_{tn}$, and count the offset amounts determined for each of the small areas $DW_{t1}$ to $DW_{tn}$ in accordance with the weighting to form a histogram. FIG. 9 is a view illustrating the weights used by the three-dimensional object detection unit 33.

As illustrated in FIG. 9, a small area $DW_m$ (where m is an integer 1 or greater and n−1 or less) is flat. In other words, in the small area $DW_m$, there is little difference between the maximum and minimum values of the count of number of the pixels indicating a predetermined difference. The three-dimensional object detection unit 33 reduces the weighting of this type of small area $DW_m$. This is because the flat small area $DW_m$ lacks a characteristic, and there is a high possibility that an error will be magnified when the offset amount has been calculated.

On the other hand, a small area $DW_{m+k}$ (where k is an integer n−m or less) has an abundant undulation. In other words, in the small area $DW_m$, there is a considerable difference between the maximum and minimum values of the count of the number of pixels indicating a predetermined difference. The three-dimensional object detection unit 33 increases the weighting of this type of small area $DW_m$. This is because the small area $DW_{m+k}$ abundant in undulation is characteristic, and there is a high possibility that the offset amount will be accurately calculated. Weighting the small areas in this manner allows for a more precise calculation of the traveling distance.

The differential waveform $DW_1$ is divided into a plurality of small areas $DW_{t1}$ to $DW_{tn}$ in the present embodiment in order to enhance the precision of the calculation of the traveling distance; however, this division into the small areas $DW_{t1}$ to $DW_{tn}$ is not required when a precise calculation of the traveling distance is not necessary. In this case, the three-dimensional object detection unit 33 calculates the traveling distance from the offset amount of the differential waveform $DW_t$ when the error between the differential waveform $DW_t$ and the differential waveform $DW_{t-1}$ is at a minimum. In other words, the method for determining the offset amount between the differential waveform $DW_{t-1}$ at a single moment prior and the differential waveform $DW_t$ at the current moment is not limited to the details described above.

The three-dimensional object detection unit 33 in the present embodiment determines the traveling speed of the host vehicle V1 (camera 10) and determines the offset amount for a stationary object from the determined traveling speed. After the offset amount of the stationary object has been determined, the three-dimensional object detection unit 33 ignores the offset amount that corresponds to the stationary object within the maximum value of the histogram and calculates the traveling distance of the three-dimensional object.

Figure 10:
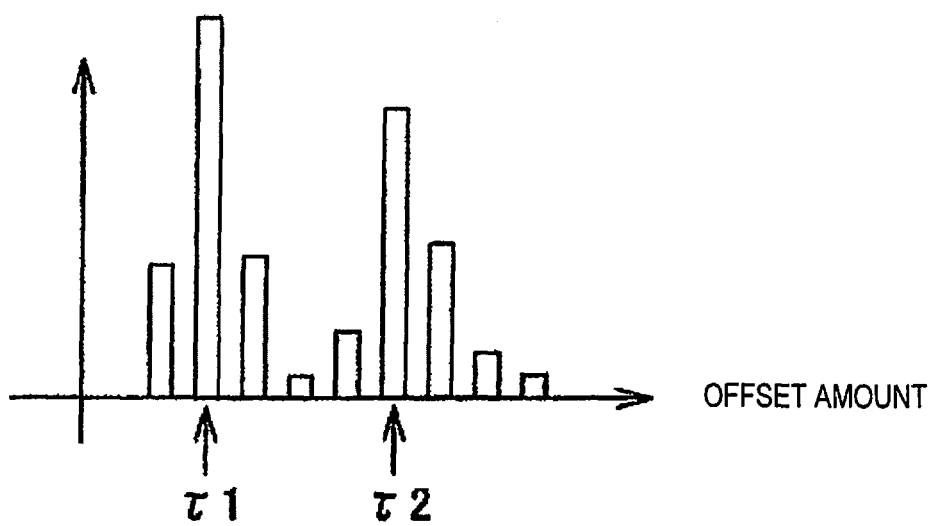
FIG. 10 is a view illustrating another example of the histogram obtained by the three-dimensional object detection unit.

FIG. 10 is a view illustrating another example of the histogram obtained by the three-dimensional object detection unit 33. When a stationary object other than the three-dimensional object is present within the view angle of the camera 10, two maximum values τ1, τ2 appear in the resulting histogram. In this case, one of the two maximum values τ1, τ2 is the offset amount of the stationary object. Consequently, the three-dimensional object detection unit 33 determines the offset amount for the stationary object from the traveling speed, ignores the maximum value that corresponds to the offset amount, and calculates the traveling distance of the three-dimensional object using the remaining maximum value. As a result, preventing a situation in which the stationary object reduces the precision of the calculation of the traveling distance of the three-dimensional object is possible.

Even when the offset amount corresponding to the stationary object is ignored, there may be a plurality of three-dimensional objects present within the view angle of the camera 10 when there is a plurality of maximum values. However, a plurality of three-dimensional objects present within the detection areas A1, A2 occurs very rarely. Accordingly, the three-dimensional object detection unit 33 stops calculating the traveling distance. In the present embodiment, preventing a situation in which an erroneous traveling distance is calculated, such as when there is a plurality of maximum values, is thereby possible.

In this way, in the present embodiment, detecting an adjacent vehicle V2 that is present in an adjacent lane by detecting a three-dimensional object that is present in the detection areas A1, A2 and determining whether or not the detected three-dimensional object is an adjacent vehicle V2 is possible.

In addition, when water film has formed on the road surface due to rainfall and the like, and a light source, such as a street light, is reflected by the road surface at night, the present embodiment is provided with a function to effectively prevent the erroneous detection of an image of such a light source as a three-dimensional object. In order to realize this type of function, the computer 30 according to the present embodiment is provided with a nighttime assessment unit 34, a luminance detection unit 35, a specific luminance peak detection unit 36, a controller 37, a turbidity calculation unit 38, a road surface state estimation unit 39, and a headlight detection unit 40. Each of the configurations is described below.

The nighttime assessment unit 34 assesses whether or not nighttime has fallen based on a captured image captured by the camera 10. The method for nighttime assessment by the nighttime assessment unit 34 is not particularly limited; for example, the nighttime assessment unit 34 can determine that nighttime has fallen when the luminance of the entire captured image captured by the camera 10 is a predetermined value or lower. In addition, the nighttime assessment unit 34 may determine whether or not nighttime has fallen based on a luminometer or the time.

Figure 11:
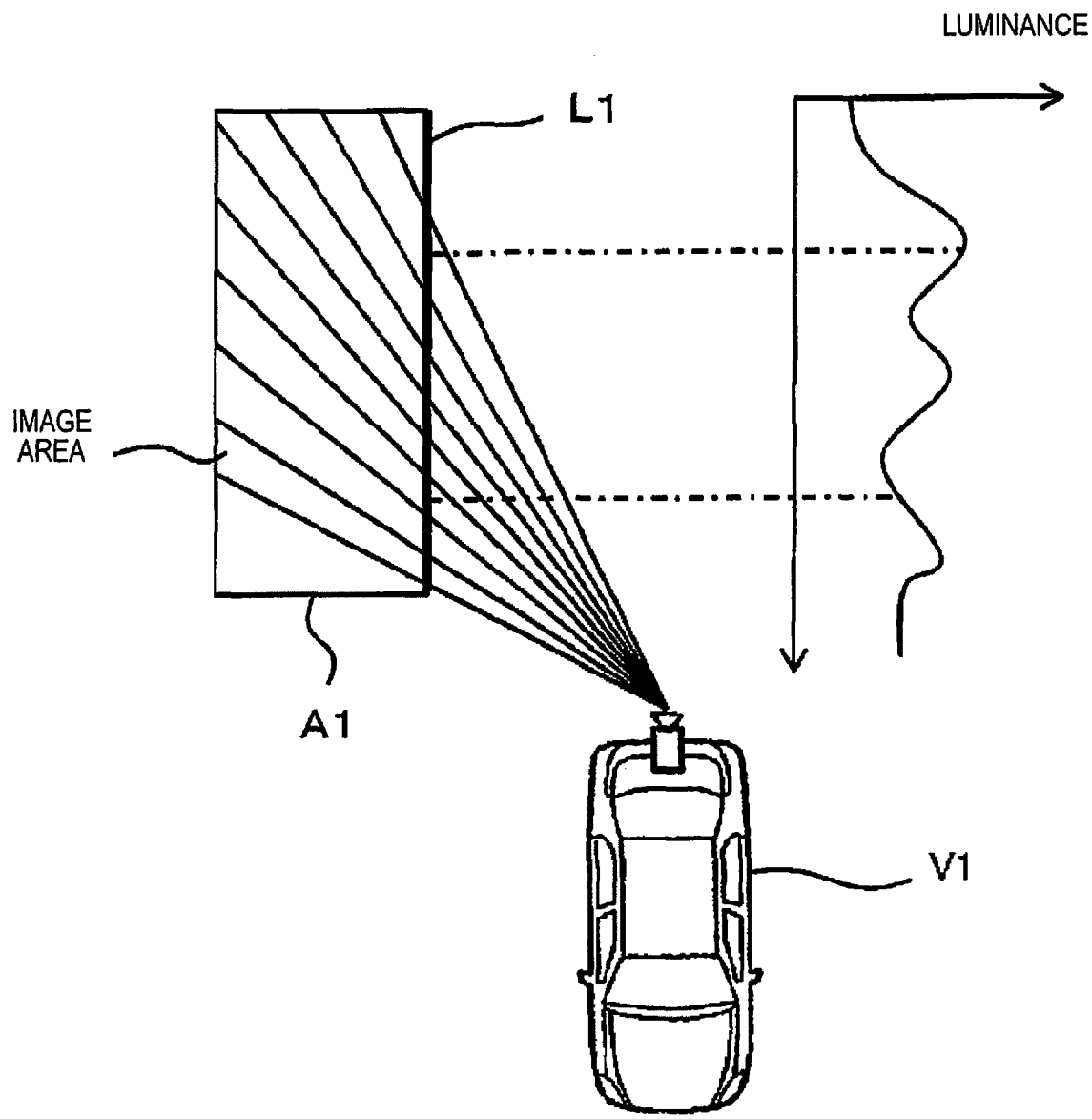
FIG. 11 is a view showing the method used by the luminance detection unit for detecting the luminance.

The luminance detection unit 35 detects the luminance of a subject from a captured image. FIG. 11 is a view showing the method for detecting the luminance by the luminance detection unit 35. Specifically, the luminance detection unit 35 divides the detection areas A1, A2 into radial pixel areas having the camera 10 as the origin. The luminance detection unit 35 then accumulates the luminance value of each pixel corresponding to each of the divided pixel areas. The luminance detection unit 35 then calculates the cumulative luminance value of each pixel area and, thereafter, determines the crossing point CP of each pixel area and ground line L1. The luminance detection unit 35 then correlates the crossing point CP and the cumulative luminance value of each pixel area and decides the horizontal-axis position, in particular, the position on the axis in the vertical direction in the drawing on the right in FIG. 11, based on the position of the crossing point CP; the luminance detection unit then decides the vertical-axis position, in particular, the position on the axis in the lateral direction in the drawing on the right in FIG. 11, from the cumulative luminance value of each pixel area and plots the positions as the cumulative luminance value at the crossing point CP, thereby generating a luminance histogram as illustrated in the drawing on the right in FIG. 11. In FIG. 11, an example was given to describe a method for detecting the luminance in the detection area A1; however, the luminance detection unit 35 detects the luminance in the detection area A2 in the same way as in the detection area A1 and generates a luminance histogram for the detection area A2. When generating a luminance histogram, the luminance detection unit 35 may plot the sum of the cumulative luminance values of two adjacent pixel areas as the cumulative luminance value of one pixel area in order to smooth the luminance histogram.

The specific luminance peak detection unit 36 detects a peak in the luminance caused by a light source, such as a street light, as a specific luminance peak based on the luminance histogram generated by the luminance detection unit 35. Specifically, the specific luminance peak detection unit 36 detects a peak in the luminance with a luminance gradient of a predetermined assessment gradient value or more among the peaks in the luminance detected in the luminance histogram as the specific luminance peak caused by a light source, such as a street light. The specific luminance peak detection unit 36 detects the specific luminance peak in both detection area A1 and detection area A2.

Figure 12:
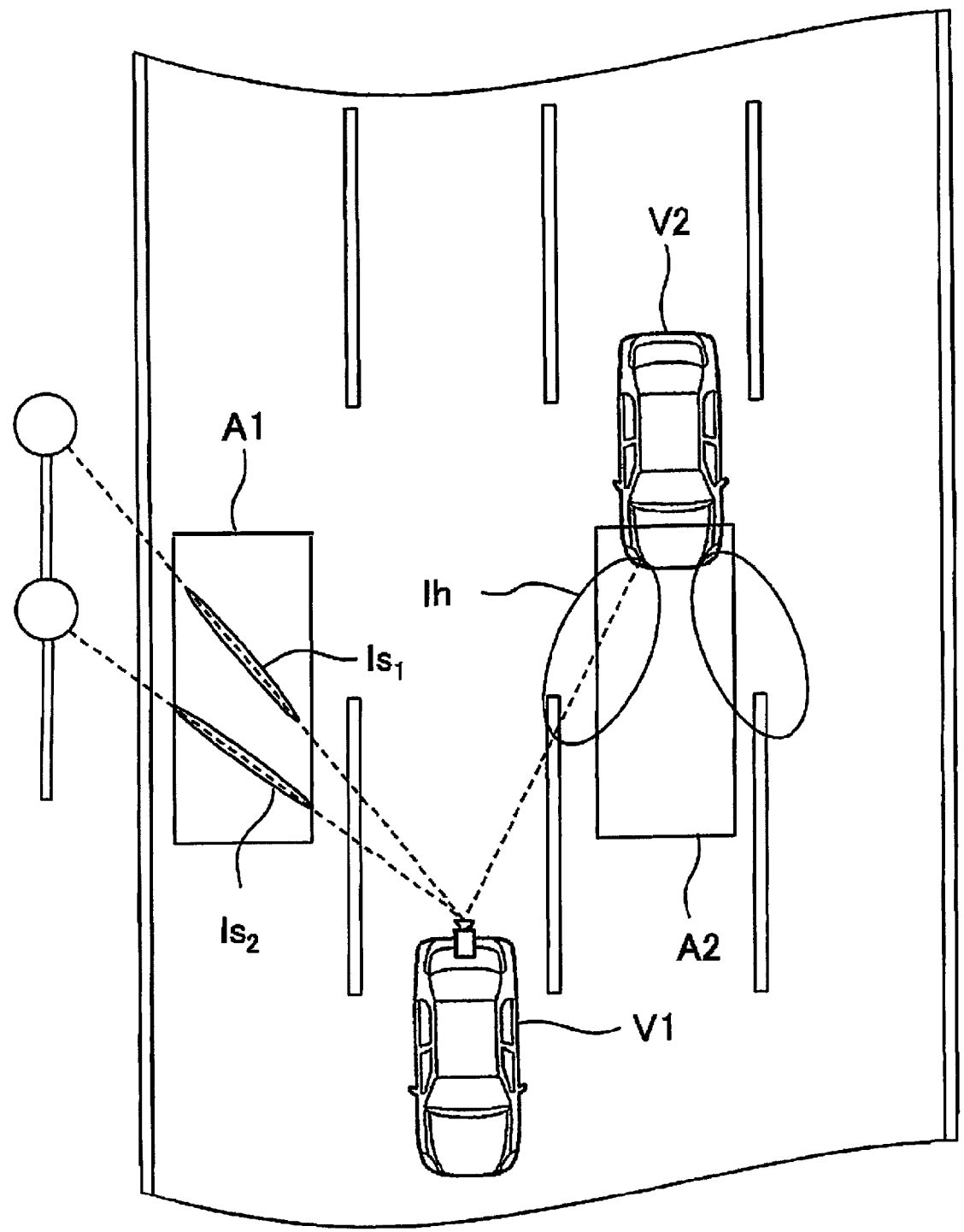
FIG. 12 is a view illustrating an example of a scene in which a host vehicle is driving.

FIG. 12 is a view illustrating an example of a scene in which a host vehicle V1 is driving, providing an example of a scene in which, due to the lights $Ls_1$, $Ls_2$ from the street lights present off the road being reflected on the road surface on which a detection area A1 is set, the lights $Ls_1$, $Ls_2$ of the street lights are detected in the detection area A1, and the light from a head light 1h of an adjacent vehicle V2 is detected in the detection area A2.

Figure 13:
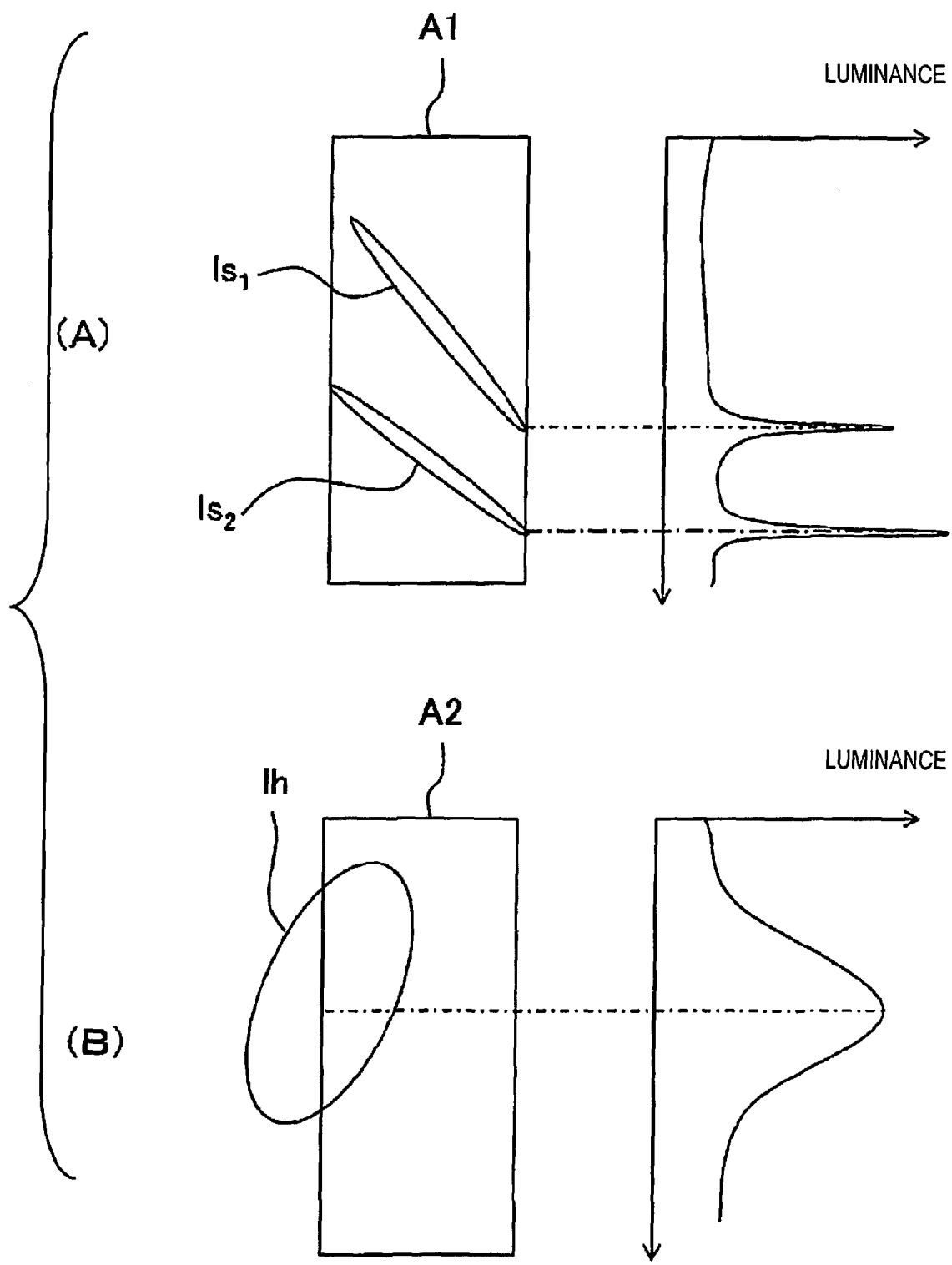
FIG. 13 is one example of a luminance histogram that is generated in the example scene illustrated in FIG. 12.

FIG. 13 is an example of a luminance histogram that is generated in the example scene illustrated in FIG. 12. As illustrated in FIG. 12, when the lights $Ls_1$, $Ls_2$ from the street lights reflected on the road surface are detected in the detection area A1, sharp peaks in the luminance corresponding to the lights $Ls_1$, $Ls_2$ from the street lights reflected on the road surface are detected in the luminance histogram for the detection area A1, as illustrated in part (A) of FIG. 13. On the other hand, when the light 1h from the head light of an adjacent vehicle V2 is detected in the detection area A2, as illustrated in FIG. 12, a gradual peak in the luminance corresponding to the headlight 1 h of the adjacent vehicle V2 is detected in the luminance histogram of the detection area A2, as illustrated in part (B) of FIG. 13. In this manner, light from a light source, such as a street light reflected on the road surface, tends to have a sharp peak in the luminance in the luminance histogram while light from the headlight of an adjacent vehicle V2 tends to have a gradual peak in the luminance in the luminance histogram. Accordingly, the specific luminance peak detection unit 36 detects specific luminance peaks corresponding to light sources, such as a street light reflected on the road surface, based on the luminance gradient of the peak in the luminance.

Figure 14:
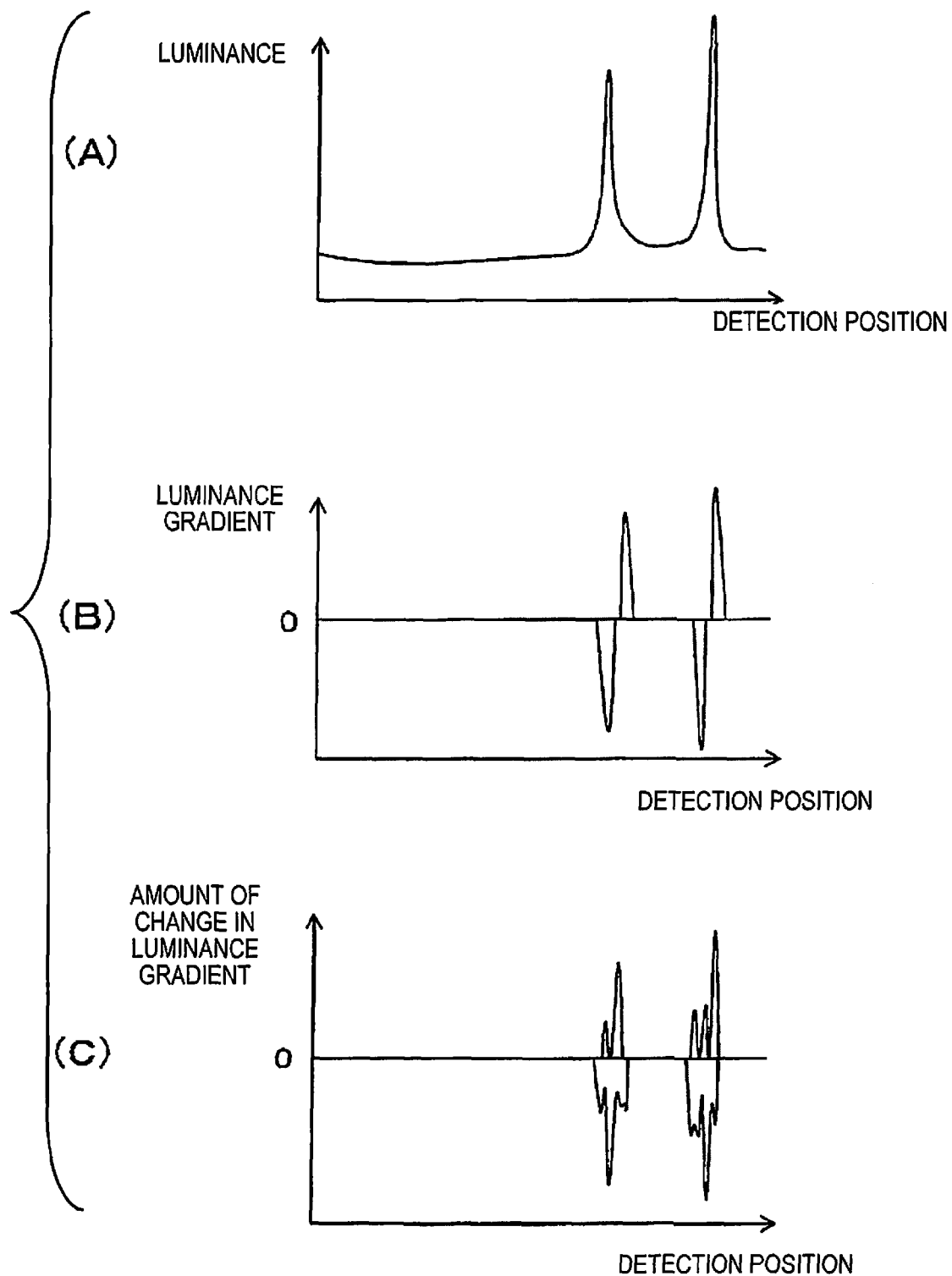
FIG. 14 is a view illustrating an example of a first derivative histogram and a second derivative histogram based on the luminance histogram that is generated in the example scene illustrated in FIG. 12.

Specifically, as illustrated in part (B) of FIG. 14, the specific luminance peak detection unit 36 generates a first derivative histogram based on the luminance histogram such as that illustrated in part (A) of FIG. 14. Additionally, the specific luminance peak detection unit 36 calculates the difference between the latest luminance histogram and the luminance histogram at a single moment prior (one processing cycle prior) as the first derivative histogram. Furthermore, the specific luminance peak detection unit 36 generates a second derivative histogram based on the generated first derivative histogram, as illustrated in part (C) of FIG. 14. Specifically, the specific luminance peak detection unit 36 calculates the difference between the latest first derivative histogram and the first derivative histogram at a single moment prior (one processing cycle prior) as the second derivative histogram in the same way as with the first derivative histogram. FIG. 14 is a view illustrating a first derivative histogram and a second derivative histogram based on the luminance histogram that is generated in the example scene illustrated in FIG. 12.

The specific luminance peak detection unit 36 then detects the luminance gradient of the peak in the luminance in the luminance histogram based on the amount of change of the luminance gradient in the second derivative histogram. When a luminance histogram such as that illustrated in part (A) of FIG. 14 is converted to a first derivative histogram or a second derivative histogram, such as those illustrated in parts (B) and (C) of FIG. 14, sharper peaks in the luminance with a larger luminance gradient caused by a light source, such as a street light reflected on the road surface, appear as larger peaks in the first derivative histogram and the second derivative histogram; conversely, more gradual peaks in the luminance with a smaller luminance gradient caused by a headlight of an adjacent vehicle V2 appear as smaller peaks in the first derivative histogram and the second derivative histogram. Therefore, when the absolute value of the amount of change in the luminance gradient in the second derivative histogram is a predetermined first change amount or greater, the specific luminance peak detection unit 36 determines that the luminance gradient of the luminance peak in the luminance histogram is large and that the peak in the luminance is sharply protruding; the luminance peak detection unit also detects the peak in the luminance as a specific luminance peak of medium luminance. When the absolute value of the amount of change in the luminance gradient in the second derivative histogram is a predetermined second change amount, which is greater than the first change amount, or greater, the specific luminance peak detection unit 36 determines that the peak in the luminance is protruding considerably and detects the peak in the luminance as a specific luminance peak of high luminance. Additionally, when detecting a specific luminance peak, the specific luminance peak detection unit 36 also detects the position and the number of the specific luminance peaks.

Returning to FIG. 3, the controller 37 controls the detection of a three-dimensional object by the three-dimensional object detection unit 33 based on the specific luminance peak detected by the specific luminance peak detection unit 36. Specifically, the controller 37 controls the detection of a three-dimensional object by the three-dimensional object detection unit 33 based on the number of specific luminance peaks and the magnitude of the luminance value detected by the specific luminance peak detection unit 36, as illustrated in FIG. 15.

Figure 16:
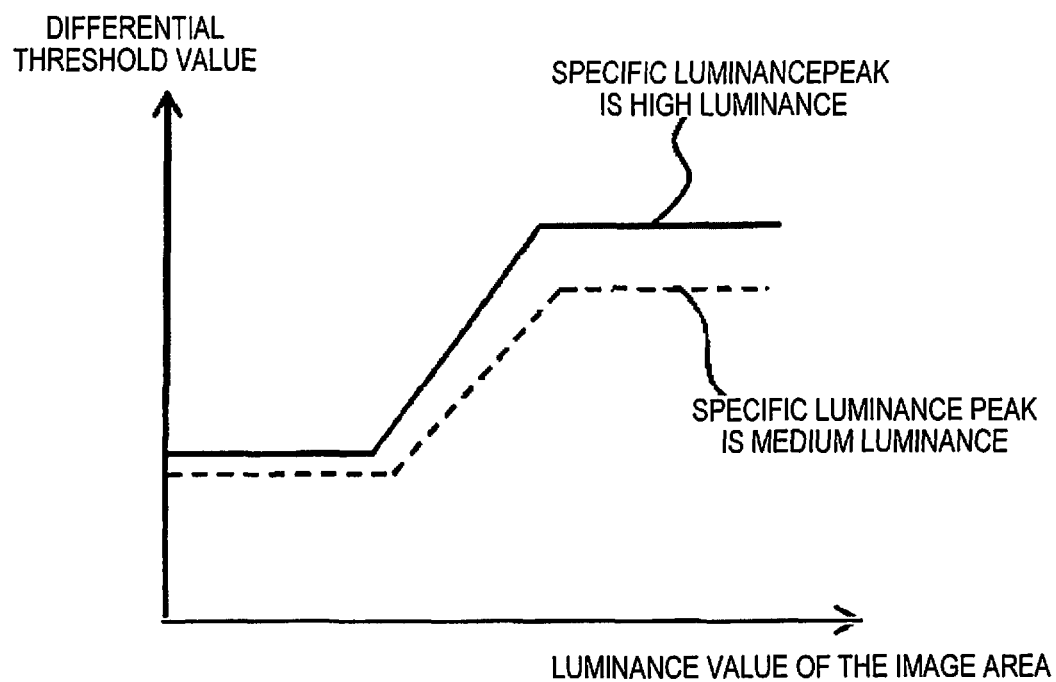
FIG. 16 is a view showing the method for setting the differential threshold value the by a controller.

Specifically, when the number of the detected specific luminance peaks is a predetermined first assessment number or greater and is less than a second assessment number, which is greater than the first assessment number, the controller 37 controls the detection of a three-dimensional object by the three-dimensional object detection unit 33 by changing the differential threshold value th to a high value in the area within the detection areas A1, A2 in which the specific luminance peaks are detected in order to suppress the detection of a three-dimensional object. FIG. 16 is a view showing the method for setting the differential threshold value th by the controller. The controller 37 sets the differential threshold value th in each of the pixel areas based on the luminance value of each pixel area in the area within detection areas A1, A2 in which the specific luminance peaks are detected, as illustrated in FIG. 16. Specifically, the controller 37 sets the differential threshold value th in the pixel area to a higher value when the luminance value of each pixel area in the area in which the specific luminance peaks are detected is higher, as illustrated in FIG. 16. A three-dimensional object is thereby less likely to be detected in the area in which the specific luminance peaks are detected; as a result, effectively preventing an erroneous detection of a light source, such as a street light reflected on the road surface, as a three-dimensional object is possible.

Additionally, when changing the differential threshold value th in the area in which the specific luminance peaks are detected, the controller 37 differentiates the differential threshold value th that is to be set depending on whether the peak is a specific luminance peak of high luminance or a specific luminance peak of medium luminance, as illustrated in FIG. 16. Specifically, when the detected specific luminance peak is a specific luminance peak of high luminance, the controller 37 changes the relationship between the differential threshold value th and the luminance value of the pixel area, so that the differential threshold value th will be set to a high value in relation to the luminance value of the same pixel area, as compared to a case in which the detected specific luminance peak is a specific luminance peak of medium luminance, as illustrated in FIG. 16. A specific luminance peak of high luminance, that is, a peak in the luminance that has a large luminance gradient and that is sharply protruding, is more likely to be caused by a light source, such as a street light that is reflected on the road surface; therefore, by increasing the differential threshold value th and increasing the degree of suppression of detecting a three-dimensional object in an area in which a specific luminance peak of high luminance is detected, as compared to an area in which a specific luminance peak of medium luminance is detected, more effectively preventing an erroneous detection of a light source, such as a street light reflected on the road surface, as a three-dimensional object is possible.

Additionally, when the number of the detected specific luminance peaks is a predetermined second assessment number or greater, the controller 37 prohibits the detection of a three-dimensional object by the three-dimensional object detection unit 33 in the area within the detection areas A1, A2 in which the specific luminance peaks are detected. Here, the specific luminance peak is thought to be caused by a light source, such as a street light reflected on the road surface; the greater the number of the detected specific luminance peaks, the more accurate the determination is that the road surface, which reflects light sources, such as a street light, is not being blocked by a three-dimensional object. In other words, the greater the number of the detected specific luminance peaks, the more accurate the determination is that a three-dimensional object is not present on the road, which reflects light sources, such as a street light. Accordingly, when the number of the detected specific luminance peaks is a predetermined second assessment number or greater and the detection of a three-dimensional object by the three-dimensional object detection unit 33 is prohibited in the area in which the specific luminance peaks are detected, preventing a reduction in the precision of detecting a three-dimensional object while effectively preventing an erroneous detection of a three-dimensional object is possible.

Figure 17:
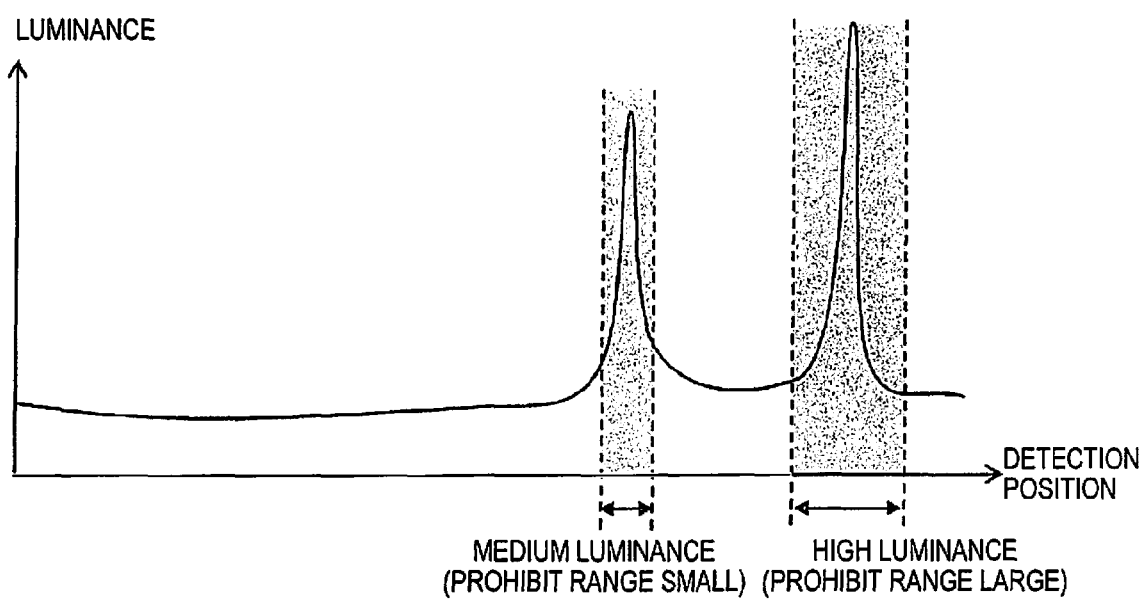
FIG. 17 is a view showing the relationship between the luminance of the specific luminance peak and the range in which the detection of a three-dimensional object is prohibited.

Additionally, when the number of the detected specific luminance peaks is a predetermined second assessment number or greater, the controller 37 differentiates the range in which the detection of a three-dimensional object is prohibited, according to the luminance of the specific luminance peak. Specifically, when the luminance of the specific luminance peak is high luminance, configuring the controller 37 to widen the range in which the detection of a three-dimensional object by the three-dimensional object detection unit 33 is prohibited (for example, the range in which the detection of a three-dimensional object by the three-dimensional object detection unit 33 is prohibited is set to a range that is wider than the area in which the specific luminance peaks are detected), when compared to a case in which the luminance of the specific luminance peak is medium luminance, as illustrated in FIG. 17, is possible. FIG. 17 is a view showing the relationship between the luminance of the specific luminance peak and the range in which the detection of a three-dimensional object is prohibited.

Figure 18:
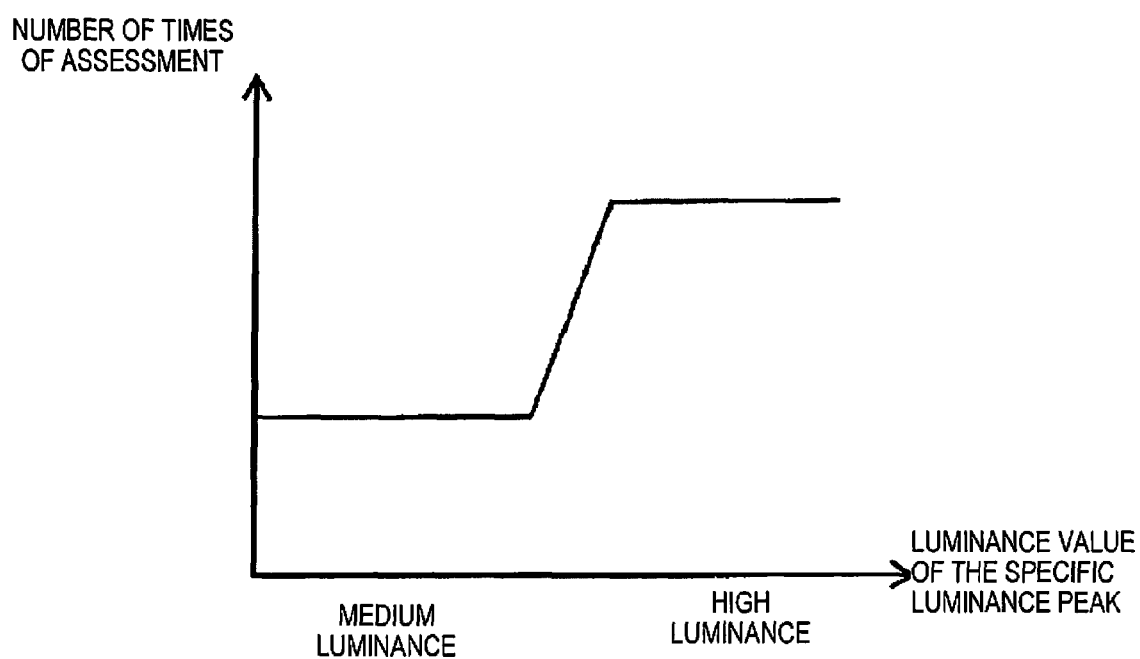
FIG. 18 is a view showing the relationship between the specific luminance peak and the number of assessments for assessing an adjacent vehicle V2.

When an adjacent vehicle V2 is being detected, the controller 37 prohibits the control of detecting a three-dimensional object based on the specific luminance peak described above for a predetermined period of time. The controller 37 may repeatedly acquire from the three-dimensional object detection unit 33 the relative traveling speed of the host vehicle V1 in relation to the traveling speed of the three-dimensional object; the controller then may determine that an adjacent vehicle V2 is overtaking the host vehicle V1 and prohibit the control of detecting a three-dimensional object based on the specific luminance peak, when the number of times that the relative traveling speed of the host vehicle V1 is a predetermined speed or less becomes a predetermined assessment number or greater. In this case, the controller 37 can set the assessment number for assessing a three-dimensional object based on the relative traveling speed of the host vehicle V1, based on the magnitude of the luminance value of the detected specific luminance peak. For example, when the specific luminance peak has a high luminance, the controller 37 can increase the assessment number, as compared to a case in which the specific luminance peak is medium luminance, as illustrated in FIG. 18. The assessment number is thereby increased when a specific luminance peak of high luminance, which has a high possibility of being caused by a light source, such as a street light reflected on the road surface, is detected; as a result, the detection of a three-dimensional object (an adjacent vehicle V2) is suppressed, and effectively preventing an erroneous detection of a light source, such as a street light reflected on the road surface, as a three-dimensional object (an adjacent vehicle V2) is possible. The predetermined speed described above is not particularly limited and may, for example, be set to 1-2 km/h or less. The reason the predetermined speed described above is set to 1-2 km/h or less, rather than to less than 0 km/h, is to prevent an erroneous detection of an image of a raindrop that is adhered to the lens of the camera 10 as a three-dimensional object that is present in the adjacent lane. FIG. 18 is a view showing the relationship between the specific luminance peak and the number of assessments for assessing an adjacent vehicle V2.

Additionally, when controlling the detection of a three-dimensional object based on the specific luminance peak, the controller 37 can be configured to control the detection of a three-dimensional object only when, among the detected specific luminance peaks, the distance between the specific luminance peaks that are the farthest apart is a predetermined distance or greater. Here, since the peak in the luminance caused by the light 1h of the headlight of an adjacent vehicle V2 is gradual, when the light hl of a headlight is present, the distance between the peaks in the luminance that are farthest apart tends to become small. Accordingly, by controlling the detection of a three-dimensional object based on the specific luminance peak only when, among the detected specific luminance peaks, the distance between specific luminance peaks that are the farthest apart is a predetermined distance or greater, effectively preventing an erroneous detection of a peak in the luminance caused by the light from the headlight of an adjacent vehicle V2 as the specific luminance peak and suppressing the detection of a three-dimensional object is possible.

Figure 19:
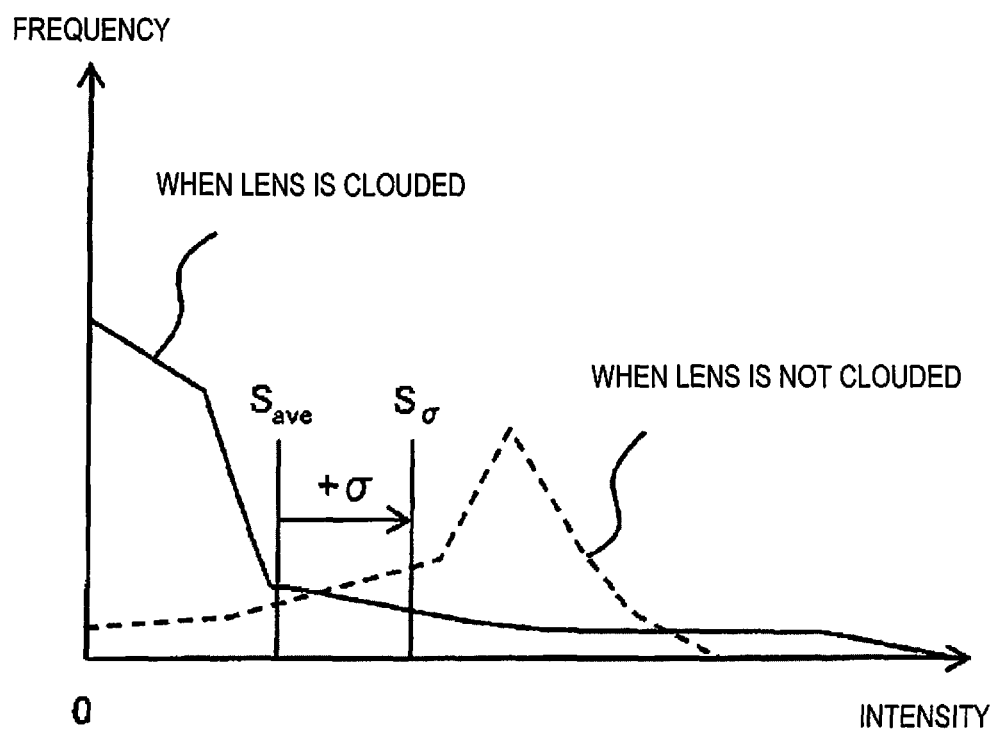
FIG. 19 is a view illustrating an example of a histogram based on the intensity of the edges.

Returning to FIG. 3, the turbidity calculation unit 38 calculates the degree to which the lens is clouded (a white thin film has formed on the lens surface) due to the adhesion of foreign matter, such as a water stain on the lens, as the turbidity of the lens. Specifically, the turbidity calculation unit 38 first extracts the edges of a subject from areas in which the extraction of a predetermined amount of edges can be expected, such as the horizon and the road edge, and generates a histogram based on the intensity of the extracted edges. FIG. 19 is a view illustrating an example of a histogram based on the intensity of the edges; the histogram when the lens is clouded is shown with a solid line, and the histogram when the lens is not clouded is shown with a broken line.

When foreign matter, such as a water stain, adheres to the lens and the lens is clouded, the outline (the edge) of the subject is blurred due to a part of the light flux from the subject being blocked or irregularly reflected by the foreign matter; the intensity of the edges that are extracted from the subject tends to become small, as compared to when the lens is not clouded, as illustrated in FIG. 19. In the present embodiment, the turbidity calculation unit 38 calculates the average value $S_{ave}$ of the intensity of the extracted edges, calculates the standard deviation δ of the intensity of the extracted edges, and calculates a value that is the sum of the average value $S_{ave}$ and the standard deviation δ of the intensity of the edges as the turbidity of the lens.

The turbidity calculation unit 38 then outputs the calculated turbidity of the lens to the controller 37. The controller thereby changes the first change amount and the second change amount for detecting the specific luminance peak according to the turbidity of the lens. Specifically, the controller 37 decreases the first change amount and the second change amount for detecting the specific luminance peak as the turbidity of the lens increases. As a result, detecting a peak in the luminance caused by a light source, such as a street light reflected on the road surface, as the specific luminance peak, even when the lens is clouded and in a scene in which the luminance gradient of the peak in the luminance caused by a light source, such as a street light reflected on the road surface, is small is possible.

The road surface state estimation unit 39 estimates whether or not the state is such that water film has formed on the road surface due to rainfall and the like. Specifically, the road surface state estimation unit 39 can estimate whether or not the state is such that water film has formed on the road surface due to rainfall and the like, based on the operating state of the wiper. For example, in the case that the operation frequency of the wiper can be set in three stages (Off, Low, and High), the road surface state estimation unit 39 estimates that there is a high possibility that rain has been falling until now and that water film (a water puddle) has formed on the road surface when the wiper is switched from High to Low or from High or Low to Off. When the operation frequency of the wiper is set to High, the road surface state estimation unit 39 may estimate that there is a high possibility that water film has formed on the road surface due to heavy rainfall. In this manner, the road surface state estimation unit 39 is able to appropriately estimate whether or not water film has formed on the road surface by estimating the rainfall state based on the operating state of the wiper.

The method for estimating the state of the road surface by the road surface state estimation unit 39 is not limited to the method described above; for example, an assessment regarding whether or not the state is such that water film has formed on the road surface can be performed in the following manner. Specifically, infrared light can be irradiated toward the lens, and a raindrop sensor (not diagrammed) can detect the attenuation amount of the irradiated infrared light that is attenuated by the raindrops to detect the amount of raindrops on the lens surface; as a result of this detection, the road surface state estimation unit 39 may estimate that water film has formed on the road surface due to rainfall when the amount of raindrops is a predetermined amount or more. Alternatively, a speculation regarding whether or not water film has formed on the road surface due to rainfall can be made by acquiring weather information via a navigation device.

Additionally, the road surface state estimation unit 39 may determine whether or not water film has formed on the road surface by determining whether or not an image of a building and the like is a false image reflected on the water or the like, which has formed on the road surface, as the result of a texture analysis of the image.

Specifically, out of the assessment lines (such as La, Lb in FIG. 5) along the direction in which a three-dimensional object collapses when the viewpoint is converted into a bird's-eye view, the road surface state estimation unit 39 specifies one reference assessment line (for example, La) with which the frequency that is counted in the differential waveform information is a predetermined value or greater; then, the road surface state estimation unit determines whether or not the luminance difference between the luminance of an image area on the reference assessment line (La) and the luminance of an image area on one or a plurality of comparative assessment lines (Lb, Lc, . . . ), including the assessment lines that are adjacent to the reference assessment line, is less than a predetermined value, and determines that a three-dimensional object detected in an area, including the image area, is a false image when the luminance difference is less than the predetermined value. The comparison of the luminance difference can be carried out by comparing the luminance of one pixel on the reference assessment line (La) or an image area that includes this pixel with the luminance of one pixel on a comparative assessment line (Lb, Lc, . . . ) or an image area that includes this pixel. In addition, the luminance difference can be determined based on the number of pixels that indicate a predetermined difference in the differential waveform information, as illustrated in FIG. 5, or a value formed into a frequency distribution. In this manner, the road surface state estimation unit 39 determines whether an image corresponding to the detected three-dimensional object is a real image or a false image by utilizing the characteristic that an image of a false image of surrounding structures that is reflected on water film on the road surface will have low contrast; as a result, the road surface state estimation unit is able to appropriately estimate whether or not the state is such that water film has formed on the road surface.

The result of estimating the road surface state, which has been estimated by the road surface state estimation unit 40, is then output to the controller 37. The controller thereby controls the detection of a three-dimensional object by the three-dimensional object detection unit 33 based on the road surface state that has been estimated by the road surface state estimation unit 40. Specifically, when a speculation has been made that water film has formed on the road surface, determination is made that there is a high possibility that a light source, such as a street light, will be reflected on the road surface, and the first change amount and the second change amount for detecting the specific luminance peak are reduced. When water film has formed on the road surface and there is a high possibility that a light source, such as a street light, will be reflected on the road surface, since appropriately detecting a peak in the luminance caused by a light source, such as a street light reflected on the road surface, as a specific luminance peak is possible, effectively preventing the erroneous detection of a light source, such as a street light reflected on the road surface, as a three-dimensional object is possible. Additionally, the controller 37 can be configured so that, when the range in which the detection of a three-dimensional object is prohibited is being changed according to the luminance of the specific luminance peak, and when a speculation has been made that water film has formed on the road surface, the range in which the detection of a three-dimensional object is prohibited is further expanded, as illustrated in FIG. 17.

Returning to FIG. 3, the headlight detection unit 40 detects the headlight of an adjacent vehicle V2 that drives behind the host vehicle V1, based on the captured image from the camera 10. Specifically, the headlight detection unit 36 detects the headlight of an adjacent vehicle V2 by detecting an image area in which the difference in brightness from the surrounding is a predetermined value or greater and that is a predetermined size or larger, as a candidate area that corresponds to the light source of the headlight of an adjacent vehicle V2. In addition, since an adjacent vehicle V2 is another vehicle that drives in an adjacent lane that is adjacent to the driving lane of the host vehicle V1, the headlight detection unit 40 detects the detected light source as a light source of a headlight of the adjacent vehicle V2 when the distance from the host vehicle V1 to the light source in the vehicle width direction is less than a predetermined distance.

The result of detecting the headlight by the headlight detection unit 40 is transmitted to the controller 37. The controller 37 thereby controls the detection of a three-dimensional object by the three-dimensional object detection unit 33 based on the result of detecting the headlight by the headlight detection unit 40. Specifically, the controller 37 prohibits the suppression of detecting a three-dimensional object when the headlight of an adjacent vehicle V2 is detected by the headlight detection unit 40. When an adjacent vehicle V2 is present in an adjacent lane, appropriately detecting the adjacent vehicle V2 is thereby possible. The configuration is not limited to that described above, and the controller 37 can be configured to decrease the degree of suppression of detecting a three-dimensional object when a headlight of the adjacent vehicle V2 is detected by the headlight detection unit 40 by, for example, increasing the first change amount and/or the second change amount. The peak in the luminance of a light of a headlight of another vehicle (an adjacent vehicle) that is present two lanes away (in an adjacent-adjacent lane) from the driving lane of the host vehicle V1 tends to protrude sharply, when compared to a headlight of an adjacent vehicle V2. Accordingly, in the present embodiment, the light of a headlight of an adjacent-adjacent vehicle is detected as a specific luminance peak; as a result, effectively preventing the erroneous detection of an adjacent-adjacent vehicle as an adjacent vehicle V2 is possible.

Figure 20:
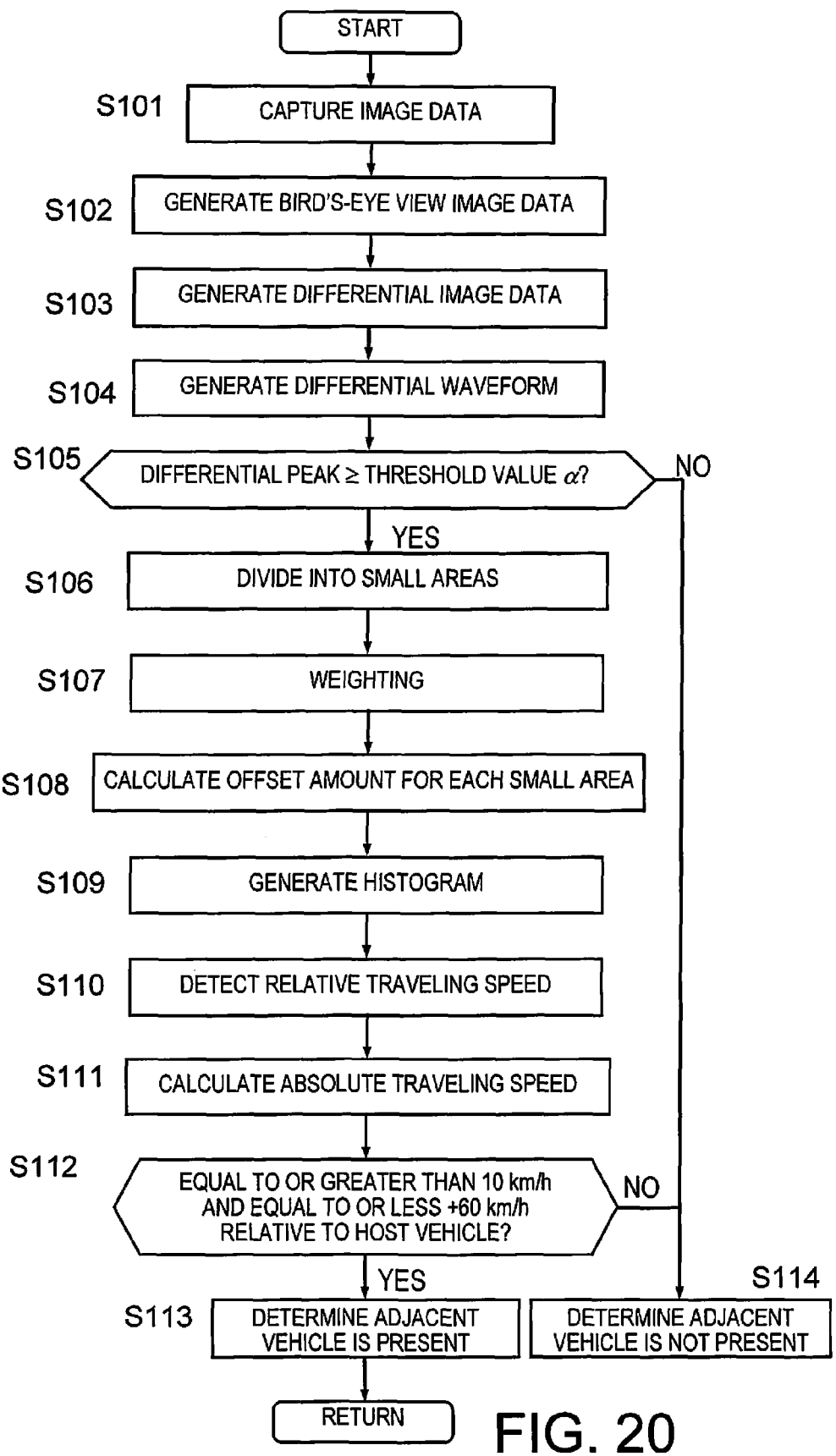
FIG. 20 is a flowchart illustrating an adjacent vehicle detection process according to a first embodiment.

Described next is the process for detecting an adjacent vehicle in accordance with the present embodiment. FIG. 20 is a flowchart illustrating the process for detecting an adjacent vehicle according to the first embodiment. First, data of a captured image is acquired by the computer 30 from the camera 10 (Step S101), and data of a bird's-eye view image $PB_t$ is generated (Step S102) by the viewpoint conversion unit 31 based on the data of the captured image thus acquired, as illustrated in FIG. 20.

The alignment unit 32 aligns the bird's-eye view image $PB_t$ data and the bird's-eye view image $PB_{t-1}$ data at a single moment prior and generates difference image $PD_t$ data (Step S103). Specifically, the alignment unit 32 takes the absolute value of the difference in the pixel values of the bird's-eye view images $PB_t$ and $PB_{t-1}$; when the absolute value is equal to or greater than a predetermined threshold value th, the pixel values of the difference image $PD_t$ are set to "1;" when the absolute value is less than a predetermined threshold value th, the pixel values of the difference image $PD_t$ are set to "0." There are cases in which the differential threshold value th for calculating the pixel values of the differential image $PD_t$ is changed in a three-dimensional object detection control process mentioned below; in the case that the differential threshold value th is changed, the changed differential threshold value th will be used in this Step S103. Additionally, in the three-dimensional object detection control process mentioned below, there are cases in which the detection of a three-dimensional object is prohibited in the pixel area within the detection areas A1, A2 in which a specific luminance peak is detected; in this case, the pixel values of the difference image $PD_t$ in the area in which the detection of a three-dimensional object is prohibited will be calculated as "0," thereby prohibiting the detection of a three-dimensional object.

The three-dimensional object detection unit 33 then counts the number of difference pixels DP having a pixel value of "1" from the difference image $PD_t$ data and generates a differential waveform $DW_t$ (Step S104). The three-dimensional object detection unit 33 then determines whether or not the peak of the differential waveform $DW_t$ is at a predetermined threshold value α or greater (Step S105). When the peak of the differential waveform $DW_t$ is not at the threshold value α or greater, in particular, when there is essentially no difference, the thought is that a three-dimensional object is not present in the captured image. Accordingly, when a determination has been made that the peak of the differential waveform $DW_t$ is not at the threshold value α or greater (Step S105=No), the three-dimensional object detection unit 33 determines that a three-dimensional object is not present and that an adjacent vehicle V2 is not present (Step S114). The operation then returns to Step S101 and repeats the operation illustrated in FIG. 20.

On the other hand, when the peak of the differential waveform $DW_t$ is determined to be at a threshold value α or greater (Step S105=Yes), a determination is made by the three-dimensional object detection unit 33 that a three-dimensional object is present in an adjacent lane, the operation proceeds to Step S106, and the three-dimensional object detection unit 33 divides the differential waveform $DW_t$ into a plurality of small areas $DW_{t1}$ to $DW_{tn}$. The three-dimensional object detection unit 33 next imparts a weighting to each of the small areas $DW_{t1}$ to $DW_{tn}$, (Step S107), calculates the offset amount for each of the small areas $DW_{t1}$ to $DW_{tn}$ (Step S108), and generates a histogram that takes into consideration the given weightings (Step S109).

The three-dimensional object detection unit 33 then calculates the relative traveling distance, which is the traveling distance of the three-dimensional object in relation to the host vehicle V1, based on the histogram (Step S110). Next, the three-dimensional object detection unit 33 calculates the absolute traveling speed of the three-dimensional object from the relative traveling distance (Step S111). At this time, the three-dimensional object detection unit 33 time-differentiates the relative traveling distance then adds the host vehicle speed detected by the vehicle speed sensor 20, and thereby calculates the relative traveling speed.

The three-dimensional object detection unit 33 then determines whether the absolute traveling speed of the three-dimensional object is 10 km/h or more and whether the relative traveling speed of the three-dimensional object in relation to the host vehicle V1 is +60 km/h or less (Step S112). When both conditions have been satisfied (Step S112=Yes), the three-dimensional object detection unit 33 determines that the detected three-dimensional object is an adjacent vehicle V2 e and that an adjacent vehicle V2 is present in the adjacent lane (Step S113). Then, the operation illustrated in FIG. 20 ends. On the other hand, when either one of the conditions has not been satisfied (Step S112=No), the three-dimensional object detection unit 33 determines that an adjacent vehicle V2 is not present in an adjacent lane (Step S114). The operation then returns to Step S101 and repeats the operation illustrated in FIG. 20.

In the present embodiment, the detection areas A1, A2 are the left and right rear of the host vehicle V1, and focus is placed on whether the host vehicle V1 may possibly make contact with another object should a lane change be made. Accordingly, the operation of Step S112 is implemented. In other words, assuming that the system in the present embodiment is actuated on an expressway, when the speed of an adjacent vehicle V2 is less than 10 km/h, there would rarely be a problem even if an adjacent vehicle V2 were to be present because the adjacent vehicle V2 would be positioned far behind the host vehicle V1 when a lane change is made. Similarly, when the relative traveling speed of an adjacent vehicle V2 exceeds +60 km/h in relation to the host vehicle V1 (i.e., when the adjacent vehicle V2 is moving at a speed 60 km/h greater than the speed of the host vehicle V1), there would rarely be a problem because the adjacent vehicle V2 would be positioned ahead of the host vehicle V1 when a lane change is made. Accordingly, the statement can be made that Step S112 determines if an adjacent vehicle V2 will pose a problem when a lane change is made.

In Step S112, a determination is made regarding whether the absolute traveling speed of the adjacent vehicle V2 is 10 km/h or greater and whether the relative traveling speed of the adjacent vehicle V2 in relation to the host vehicle V1 is +60 km/h or less, thereby having the following effect. For example, a possible case is that the absolute traveling speed of a stationary object is detected to be several kilometers per hour, depending on the attachment error of the camera 10. Accordingly, determining whether the speed is 10 km/h or greater reduces the possibility that the stationary object will be determined to be an adjacent vehicle V2. Also, this creates the possibility that the relative speed of an adjacent vehicle V2 in relation to the host vehicle V1 will be detected to be in excess of +60 km/h due to noise. Accordingly, determining whether the relative speed is +60 km/h or less can reduce the possibility of an erroneous detection due to noise.

Furthermore, in lieu of the process of Step S112, a determination can be made regarding whether the absolute traveling speed of the adjacent vehicle V2 is not negative or not 0 km/h. In addition, in the present embodiment, since focus is placed on whether the host vehicle V1 may possibly make contact with another object should a lane change be made, a warning sound may be emitted to the driver of the host vehicle, or a corresponding warning may be displayed by a predetermined display device when an adjacent vehicle V2 is detected in Step S113.

Figure 21:
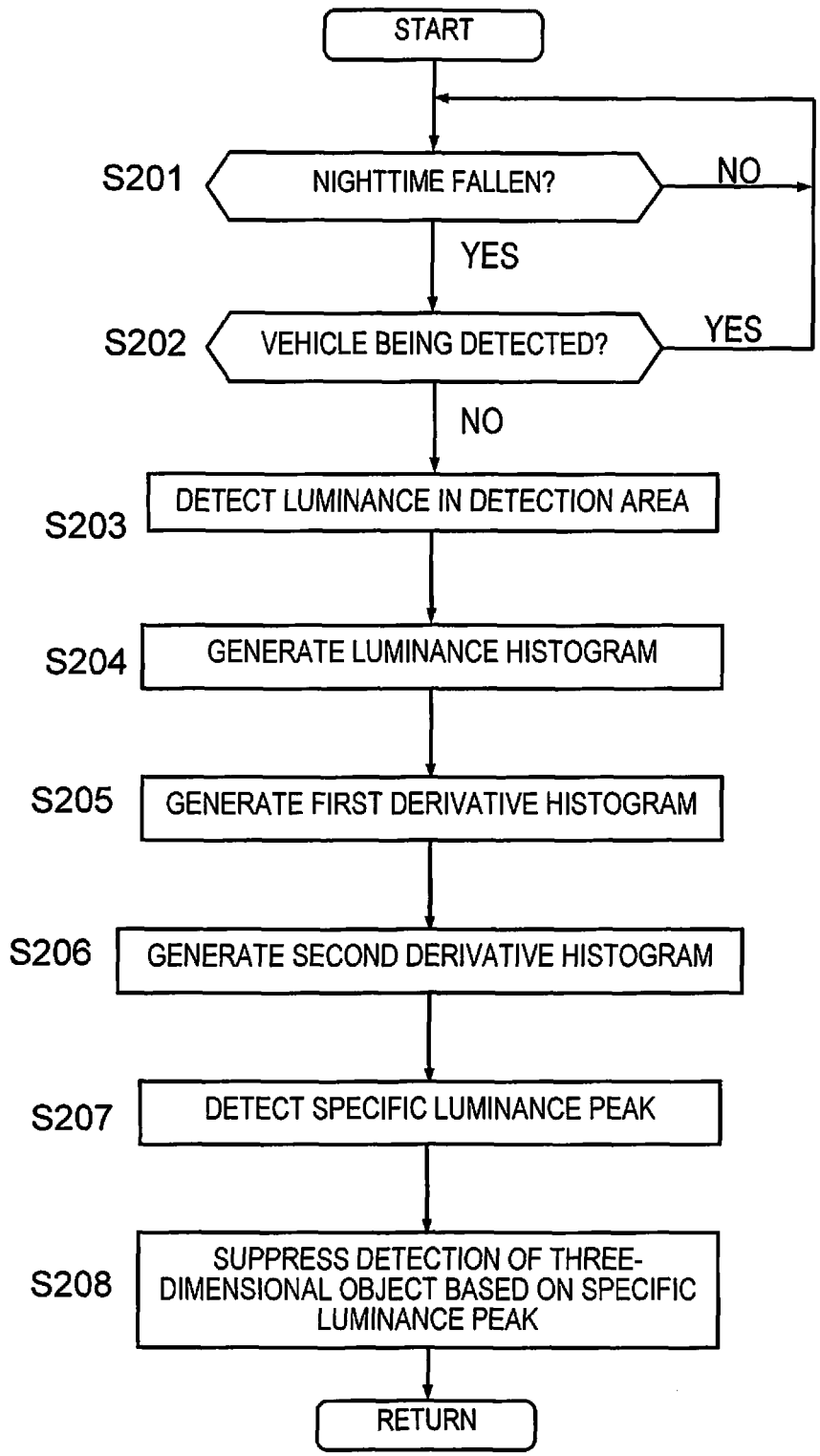
FIG. 21 is a flowchart illustrating a three-dimensional object detection control process according to the first embodiment.

Described next with reference to FIG. 21 is a three-dimensional object detection control process according to the first embodiment. FIG. 21 is a flowchart illustrating a three-dimensional object detection control process according to the first embodiment. The three-dimensional object detection control process described below is carried out in parallel with the adjacent vehicle detection process, as illustrated in FIG. 20. The detection of a three-dimensional object is thereby carried out during the adjacent vehicle detection process illustrated in FIG. 20 in accordance with the control of this three-dimensional object detection control process.

As illustrated in FIG. 21, first, in Step S201, an assessment is made regarding whether or not nighttime has fallen by the nighttime assessment unit 34. When an assessment has been made that nighttime has fallen, the operation proceeds to Step S202; when an assessment has been made that nighttime has not fallen, the operation waits at Step S201.

In Step S202, the controller 37 assesses whether or not an adjacent vehicle V2 is being detected. The controller 37 is able to determine whether or not an adjacent vehicle V2 is being detected by determining whether or not a three-dimensional object is an adjacent vehicle V2 that is overtaking the host vehicle V1 based on the traveling speed of the host vehicle V1 in relation to the three-dimensional object. Furthermore, the controller 37 is able to determine whether or not an adjacent vehicle V2 is being detected based on the operation results of the adjacent vehicle detection process, as illustrated in FIG. 20. When a determination has been made that an adjacent vehicle V2 is being detected, the operation returns to Step S201; when a determination has been made that an adjacent vehicle V2 is not being detected, the operation proceeds to Step S203.

The luminance of the subject is detected by the luminance detection unit 35 in Step S203. Specifically, the luminance detection unit 35 divides the detection areas A1, A2 into a plurality of image areas and calculates the cumulative value of the luminance in each pixel area, as illustrated in FIG. 11. In the subsequent Step S204, the luminance detection unit 35 plots the luminance of each pixel area detected in Step S203 in the vehicle driving direction and generates a luminance histogram, such as that illustrated in part (A) of FIG. 14.

In Step S205, the specific luminance peak detection unit 36 generates a first derivative histogram based on the luminance histogram generated in Step S204; in the subsequent Step S206, a second derivative histogram is generated based on the first derivative histogram generated in Step S205.

In Step S207, the specific luminance peak detection unit 36 detects the specific luminance peak based on the second derivative histogram generated in Step S206. Specifically, the specific luminance peak detection unit 36 detects a peak in the luminance in which the amount of change of the luminance gradient exceeds a predetermined first change amount as a specific luminance peak of medium luminance and detects a peak in the luminance that exceeds a second change amount, which is greater than the first change amount as a specific luminance peak of high luminance.

In Step S208, the controller 37 carries out an operation for suppressing the detection of a three-dimensional object by the three-dimensional object detection unit 33 based on the specific luminance peaks detected in Step S207. Specifically, the controller 37 changes the differential threshold value th to a high value or prohibits the detection of a three-dimensional object in the pixel areas in which the specific luminance peaks were detected, based on the number of detected specific luminance peaks and the magnitude of the luminance value, as illustrated in FIG. 17. Accordingly, the detection of a three-dimensional object is suppressed in areas in which the specific luminance peaks are caused by a light source, such as a street light reflected on the road surface; as a result, effectively preventing the erroneous detection of a light source, such as a street light reflected on the road surface, as a three-dimensional object is possible.

In Step S208, when suppressing the detection of a three-dimensional object by the three-dimensional object detection unit 33, the controller 37 changes the degree of suppression when suppressing the detection of a three-dimensional object according to the ease with which a light source, such as a street light reflected on the road surface, can be detected and the like. For example, when the lens of the camera 10 is clouded, detecting the peak in the luminance caused by a light source, such as a street light reflected on the road surface, is difficult; therefore, the controller 37 sets the degree of suppression for detecting a three-dimensional object to be low. Additionally, when water film has formed on the road surface, there is a high possibility that a light source, such as a street light, will be reflected on the road surface; therefore, the controller 37 sets the degree of suppression for detecting a three-dimensional object to be high. Furthermore, when an adjacent vehicle V2 is present in an adjacent lane, the controller 37 prohibits the suppression of the detection of a three-dimensional object in order to appropriately detect the adjacent vehicle V2.

As described above, in the first embodiment, effectively preventing the erroneous detection of a light source, such as a street light reflected on the road surface, as a three-dimensional object is possible by detecting a peak in the luminance caused by a light source, such as a street light reflected on the road surface, as a specific luminance peak, and by suppressing the detection of a three-dimensional object in areas within the detection areas A1, A2 in which the specific luminance peaks have been detected.

Embodiment 2

Figure 22:
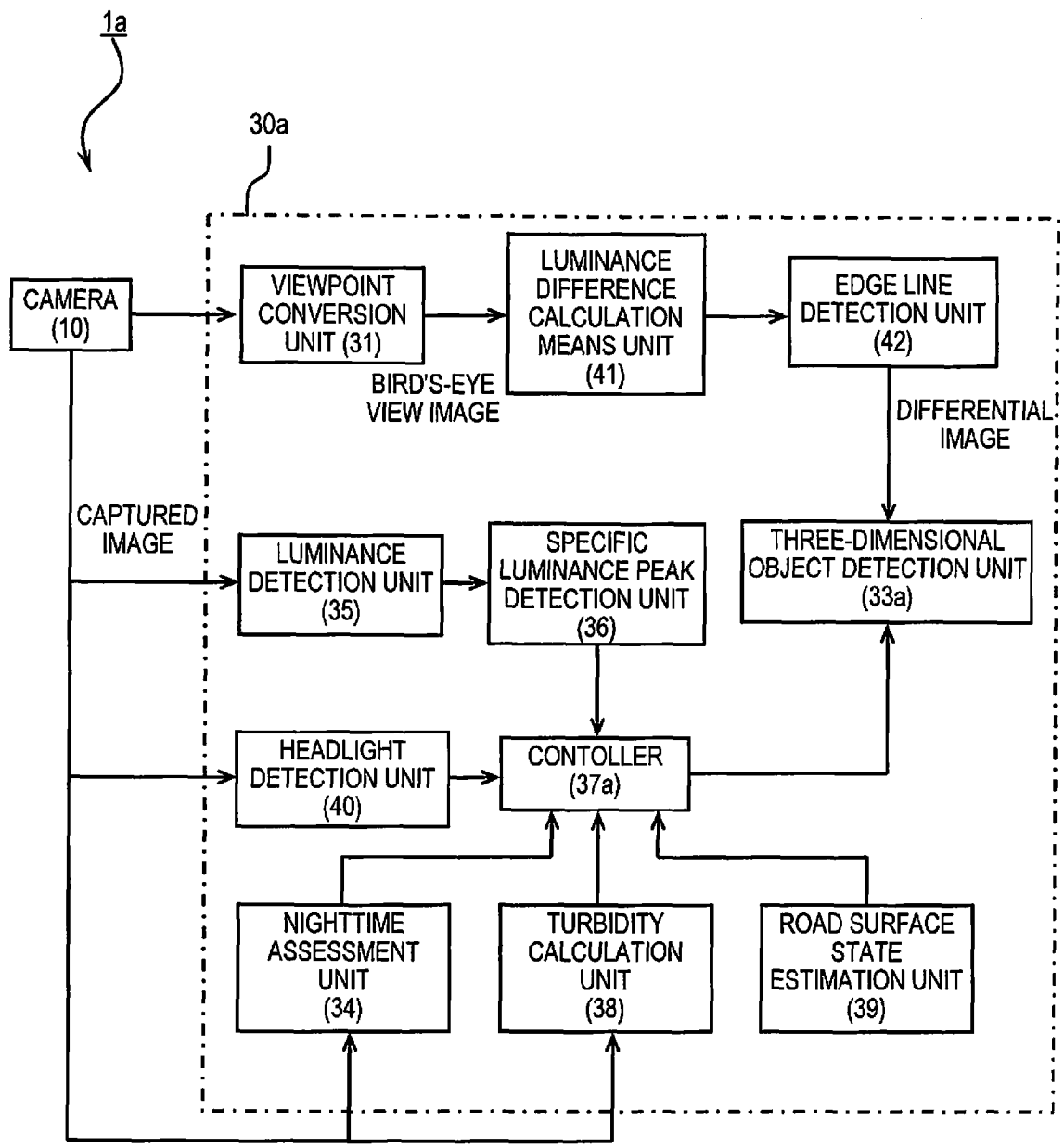
FIG. 22 is a block view illustrating the details of the computer according to a second embodiment.

Described next is a three-dimensional object detection device 1a according to the second embodiment. The three-dimensional object detection device 1a according to the second embodiment is the same as that in the first embodiment, except that a computer 30a is provided in lieu of the computer 30 of the first embodiment, as illustrated in FIG. 22; the operation is as described below. Here, FIG. 22 is a block view illustrating the details of the computer 30a according to the second embodiment.

The three-dimensional object detection device 1a according to the second embodiment is provided with a camera 10 and a computer 30a, as illustrated in FIG. 22. The computer 30a is provided with a viewpoint conversion unit 31, a luminance difference calculation unit 41, an edge line detection unit 42, a three-dimensional object detection unit 33a, a nighttime assessment unit 34, a luminance detection unit 35, a specific luminance peak detection unit 36, a controller 37a, a turbidity calculation unit 38, a road surface state estimation unit 39, and a headlight detection unit 40. The configuration of the three-dimensional object detection device 1a according to the second embodiment is described below. The configurations of the viewpoint conversion unit 31, the nighttime assessment unit 34, the luminance detection unit 35, the specific luminance peak detection unit 36, the turbidity calculation unit 38, the road surface state estimation unit 39, and the headlight detection unit 40 are the same as those in the first embodiment, so these descriptions have been omitted.

Figure 23:
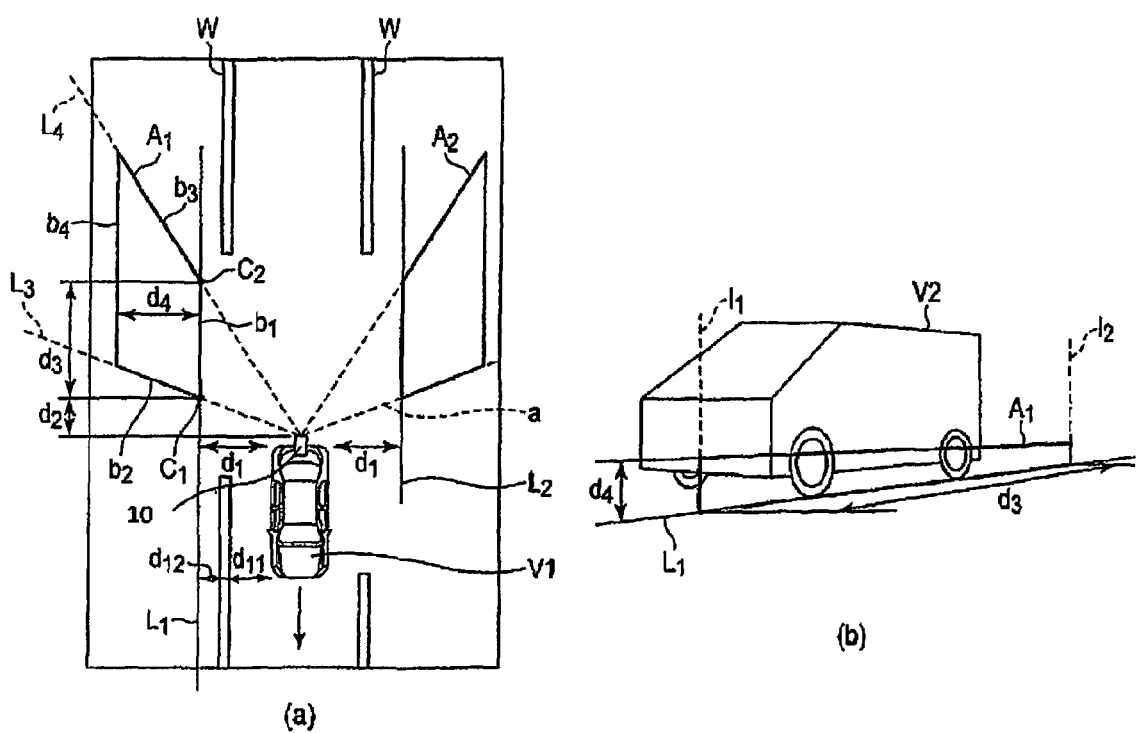
FIG. 23 is a view illustrating the driving state of the vehicle, with part (a) of FIG. 23 being a plan view illustrating the positional relationship between the detection areas, and part (b) of FIG. 23 being a perspective view illustrating the positional relationship between the detection areas in real space.

FIG. 23 is a view illustrating the capture range of the camera 10 in FIG. 22. Part (a) of FIG. 23 is a plan view, and part (b) of FIG. 23 is a perspective view in real space, rearward from the host vehicle V1. The camera 10 is set to a predetermined view angle a, and the rear side of the host vehicle V1 included in the predetermined view angle a is captured, as illustrated in part (a) of FIG. 23. The view angle a of the camera 10 is set so that the adjacent lanes are included in the capture range of the camera 10 in addition to the lane in which the host vehicle V1 is driving, in the same manner as illustrated in FIG. 2.

The detection areas A1, A2 in the present example are trapezoidal in a plan view (the bird's-eye view state), and the position, size, and shape of the detection areas A1, A2 are decided based on the distances $d_1$ to $d_4$. The detection areas A1, A2 of the example illustrated in the drawing are not limited to being trapezoidal; they may also be rectangular or another shape from a bird's-eye view state, as illustrated in FIG. 2.

Here, the distance d1 is the distance from the host vehicle V1 to the ground lines L1, L2. The ground lines L1, L2 refer to a line in which a three-dimensional object, which is present in a lane adjacent to the lane in which the host vehicle V1 is driving, is in contact with the ground. In the present embodiment, an objective is to detect an adjacent vehicle V2 or the like (including two-wheeled vehicles or the like) driving in the left or right lane behind the host vehicle V1 and adjacent to the lane of the host vehicle V1. Accordingly, the distance d1, which is the position of the ground lines L1, L2 of the adjacent vehicle V2, can be decided so as to be substantially fixed from the distance d11 of the host vehicle V1 to a white line W and the distance d12 from the white line W to the position in which the adjacent vehicle V2 is predicted to drive.

The distance d1 is not limited to being predetermined, and may be variable. In this case, the computer 30a recognizes the position of the white line W in relation to the host vehicle V1 using white line recognition or another technique, and the distance d11 is decided based on the position of the recognized white line W. The distance d1 is thereby variably set using the decided distance d11. In the present embodiment described below, the position in which the adjacent vehicle V2 is driving (the distance d12 from the white line W) and the position in which the host vehicle V1 is driving (the distance d11 from the white line W) is mostly predictable, and the distance d1 is predetermined.

A distance d2 is the distance extending from the rear end part of the host vehicle V1 in the vehicle driving direction. The distance d2 is determined so that the detection areas A1, A2 are accommodated within at least the view angle a of the camera 10. In the present embodiment in particular, the distance d2 is set so as to be in contact with a range partitioned within the view angle a. The distance d3 indicates the length of the detection areas A1, A2 in the vehicle driving direction. The distance d3 is determined based on the size of the three-dimensional object to be detected. In the present embodiment, the object to be detected is an adjacent vehicle V2 or the like; therefore, the distance d3 is set to a length that includes the adjacent vehicle V2.

The distance d4 indicates the height, which has been set so that the tires of the adjacent vehicle V2 or the like are included in real space, as illustrated in part (b) of FIG. 23. In a bird's-eye view image, the distance d4 is the length illustrated in part (a) of FIG. 23. The distance d4 may also be a length that does not include the lanes further adjacent to the left and right adjacent lanes in the bird's-eye view image (i.e., adjacent-adjacent lanes that are two lanes away). This is because when the lanes that are two lanes away from the lane of the host vehicle V1 are included, distinguishing whether an adjacent vehicle V2 is present in the adjacent lanes to the left and right of the lane in which the host vehicle V1 is driving or whether an adjacent-adjacent vehicle is present in an adjacent-adjacent lane that is two lanes away is no longer possible.

As described above, the distances d1 to d4 are determined, and the position, the size, and the shape of the detection areas A1, A2 are thereby determined. More specifically, the position of the top side b1 of the detection areas A1, A2 that form a trapezoid is determined by the distance d1. The starting position C1 of the top side b1 is determined by the distance d2. The end position C2 of the top side b1 is determined by the distance d3. The lateral side b2 of the detection areas A1, A2 that form a trapezoid is determined by a straight line L3 extending from the camera 10 toward the starting position C1. Similarly, the lateral side b3 of the detection areas A1, A2 that form a trapezoid is determined by a straight line L4 extending from the camera 10 toward the end position C2. The position of the lower side b4 of the detection areas A1, A2 that form a trapezoid is determined by the distance d4. In this manner, the areas surrounded by the sides b1 to b4 are the detection areas A1, A2. The detection areas A1, A2 are regular squares (rectangles) in real space rearward from the host vehicle V1, as illustrated in part (b) of FIG. 23.

The luminance difference calculation unit 41 calculates the luminance differences in the bird's-eye view image data, which has undergone viewpoint conversion by the viewpoint conversion unit 31, in order to detect the edges of a three-dimensional object included in the bird's-eye view image. The luminance difference calculation unit 41 calculates, for each of a plurality of positions along a perpendicular imaginary line extending along the perpendicular direction in real space, the luminance difference between two pixels near each position. The luminance difference calculation unit 41 is capable of calculating the luminance difference by a method for setting a single perpendicular imaginary line extending in the perpendicular direction in real space or by a method for setting two perpendicular imaginary lines.

Described below is the specific method for setting two perpendicular imaginary lines. The luminance difference calculation unit 41 sets a first perpendicular imaginary line that corresponds to a line segment extending in the perpendicular direction in real space and a second perpendicular imaginary line that is different from the first perpendicular imaginary line and that corresponds to the line segment extending in the perpendicular direction in real space. The luminance difference calculation unit 41 determines the luminance difference between a point on the first perpendicular imaginary line and a point on the second perpendicular imaginary line in continuous fashion along the first perpendicular imaginary line and the second perpendicular imaginary line. The operation of the luminance difference calculation unit 41 is described in detail below.

Figure 24:
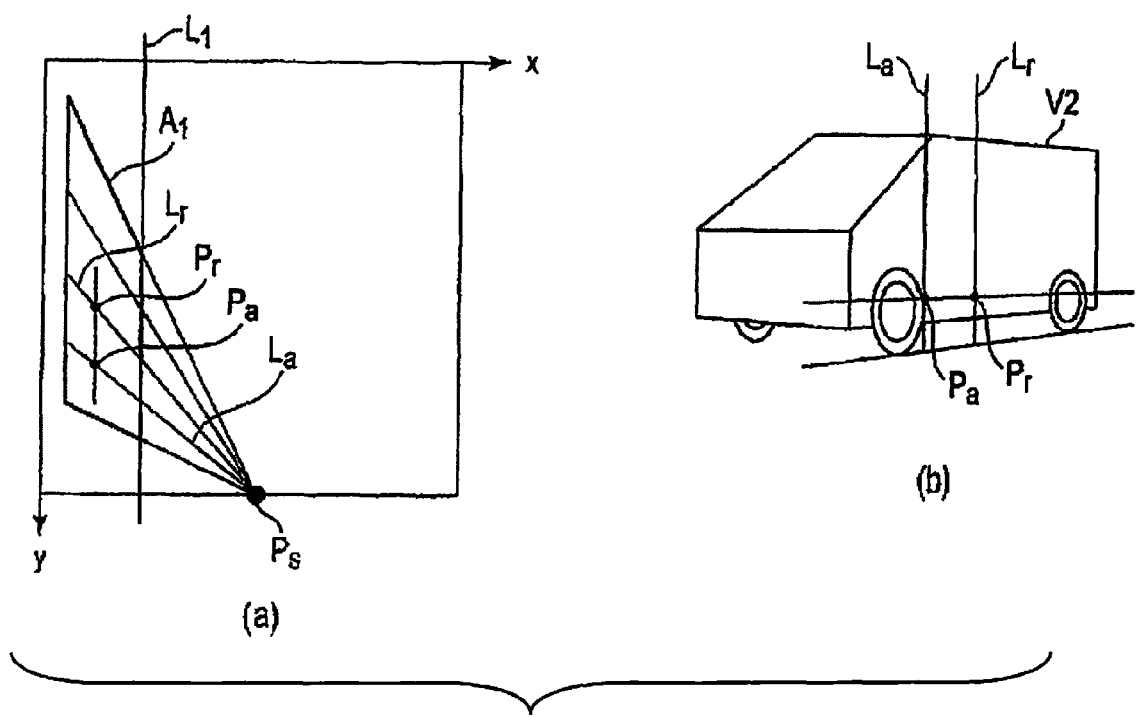
FIG. 24 is a view showing the operation of the brightness difference calculation unit according to the second embodiment, with part (a) of FIG. 24 being a view illustrating the positional relationship between an attention line, a reference line, an attention point, and a reference point in the bird's-eye view; part (b) of FIG. 24 being a view illustrating the positional relationship between the attention line, the reference line, the attention point, and the reference point in real space.

The luminance difference calculation unit 41 sets a first perpendicular imaginary line La (hereinafter referred to as the attention line La) that corresponds to a line segment extending in the perpendicular direction in real space and that passes through the detection area A1, as illustrated in part (a) of FIG. 24. The luminance difference calculation unit 41 sets a second perpendicular imaginary line Lr (hereinafter referred to as the reference line Lr) that is different from the attention line La, that corresponds to the line segment extending in the perpendicular direction in real space, and that passes through the detection area A1. Here, the reference line Lr is set to a position that is a predetermined distance in real space from the attention line La. The lines that correspond to the line segments extending in the perpendicular direction in real space are lines that spread out in the radial direction from the position Ps of the camera 10 in a bird's-eye view image. These lines that spread out in the radial direction are lines that follow the collapsing direction of the three-dimensional object when converted into a bird's-eye view.

The luminance difference calculation unit 41 sets an attention point Pa on the attention line La (a point on the first perpendicular imaginary line). The luminance difference calculation unit 41 sets a reference point Pr on the reference line Lr (a point on the second perpendicular imaginary line). The attention line La, the attention point Pa, the reference line Lr, and the reference point Pr have the relationship in real space that is illustrated in part (b) of FIG. 24. As is apparent from part (b) of FIG. 24, the attention line La and the reference line Lr are lines that extend in the perpendicular direction in real space, and that the attention point Pa and the reference point Pr are points set to substantially the same height in real space. The attention point Pa and the reference point Pr are not necessarily required to be rigorously kept at the same height, and a certain amount of error that allows for the attention point Pa and the reference point Pr to be deemed to be at the same height is allowed.

The luminance difference calculation unit 41 determines the luminance difference between the attention point Pa and the reference point Pr. If the luminance difference between the attention point Pa and the reference point Pr is great, an edge may possibly be present between the attention point Pa and the reference point Pr. In the second embodiment in particular, a perpendicular imaginary line is set as a line segment extending in the perpendicular direction in real space in relation to the bird's-eye view image in order to detect a three-dimensional object present in the detection areas A1, A2. Therefore, there is a high possibility that there is an edge of a three-dimensional object in the location where the attention line La has been set when the luminance difference between the attention line La and the reference line Lr is high. Accordingly, the edge line detection unit 42 illustrated in FIG. 22 detects an edge line based on the luminance difference between the attention point Pa and the reference point Pr.

Figure 25:
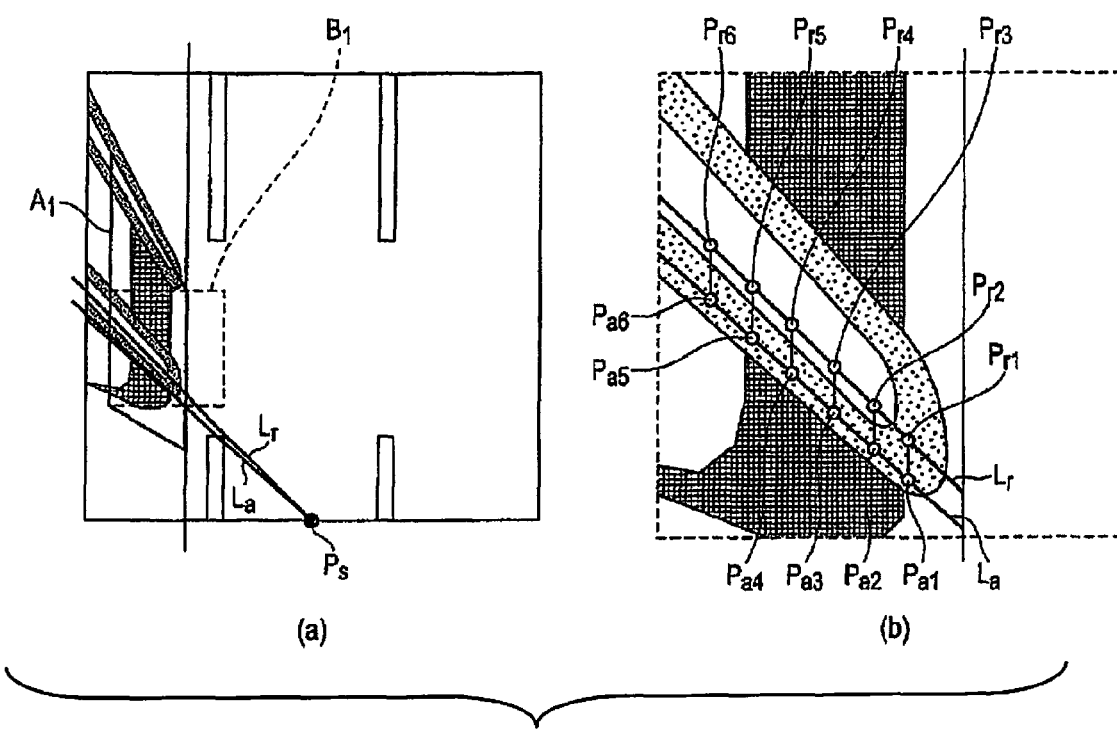
FIG. 25 is a view showing the detailed operation of the luminance difference calculation unit according to the second embodiment, with part (a) of FIG. 25 being a view illustrating the detection area in the bird's-eye view, and part (b) of FIG. 25 being a view illustrating the positional relationship between the attention line, the reference line, the attention point, and the reference point in the bird's-eye view.

This point will be described in greater detail. FIG. 25 is a view showing the detailed operation of the luminance difference calculation unit 41. Part (a) of FIG. 25 illustrates a bird's-eye view image of the bird's-eye view state, and part (b) of FIG. 25 is an enlarged view of a part B1 in the bird's-eye view image, as illustrated in part (a) of FIG. 25. In FIG. 25, only the detection area A1 is illustrated and shown, but the luminance difference is calculated using the same procedure for detection area A2.

When the adjacent vehicle V2 is being displayed in the captured image captured by the camera 10, the adjacent vehicle V2 appears in the detection area A1 in the bird's-eye view image, as illustrated in part (a) of FIG. 25. The attention line La is set on a rubber portion of a tire of the adjacent vehicle V2 in the bird's-eye view image in part (b) of FIG. 25, as illustrated in the enlarged view of area B1 in part (a) of FIG. 25. In this state, first, the luminance difference calculation unit 41 sets the reference line Lr. The reference line Lr is set along the perpendicular direction in a position set at a predetermined distance in real space from the attention line La. Specifically, in the three-dimensional object detection device 1a according to the present embodiment, the reference line Lr is set in a position at a distance of 10 cm away in real space from the attention line La. The reference line Lr is thereby set on the wheel of the tire of the adjacent vehicle V2 set, for example, at a distance that corresponds to 10 cm from the rubber of the tire of the adjacent vehicle V2 in the bird's-eye view image.

Next, the luminance difference calculation unit 41 sets a plurality of attention points Pa1 to PaN on the attention line La. In part (b) of FIG. 25, six attention points Pa1 to Pa6 (hereinafter referred to as attention point Pai when indicating an arbitrary point) are set for the convenience of this description. An arbitrary number of attention points Pa may be set on the attention line La. In the description below, N attention points Pa are set on the attention line La.

The luminance difference calculation unit 41 subsequently sets the reference points Pr1 to PrN so that they have the same height as the attention points Pa1 to PaN in real space. The luminance difference calculation unit 41 calculates the luminance difference between the attention point Pa and reference point Pr pairs at the same height. The luminance difference calculation unit 41 thereby calculates the luminance difference between two pixels for each of the plurality of positions (1–N) along the perpendicular imaginary line extending in the perpendicular direction in real space. The luminance difference calculation unit 41 calculates the luminance difference between, for example, a first attention point Pa1 and a first reference point Pr1 and calculates the luminance difference between a second attention point Pa2 and a second reference point Pr2. The luminance difference calculation unit 41 thereby determines the luminance difference in a continuous fashion along the attention line La and the reference line Lr. In other words, the luminance difference calculation unit 41 sequentially determines the luminance difference between the third to $N^{th}$ attention points Pa3 to PaN and the third to $N^{th}$ reference points Pr3 to PrN.

The luminance difference calculation unit 41 repeats the operation of setting the above-described reference line Lr, setting the attention point Pa, setting the reference point Pr, and calculating the luminance difference while shifting the attention line La within the detection area A1. In other words, the luminance difference calculation unit 41 repeatedly executes the above-described process while changing the positions of the attention line La and the reference line Lr by the same distance in real space along the direction in which the ground line L1 extends. The luminance difference calculation unit 41, for example, sets the line that was the reference line Lr in the previous operation to be the attention line La, sets the reference line Lr in relation to the attention line La, and sequentially determines the luminance difference.

In this manner, in the second embodiment, determining the luminance difference from the attention point Pa on the attention line La and the reference point Pr on the reference line Lr, which are at substantially the same height in real space, allows the luminance difference to be distinctly detected when an edge extending in the perpendicular direction is present. The precision for detecting a three-dimensional object can be enhanced without the operation for detecting the three-dimensional object being affected even when the three-dimensional object is enlarged in accordance with the height from the road surface by the conversion to a bird's-eye view image in order to compare the luminance between the perpendicular imaginary lines extending in the perpendicular direction in real space.

Returning to FIG. 22, the edge line detection unit 42 detects the edge line from the continuous luminance difference calculated by the luminance difference calculation unit 41. For example, in the case illustrated in part (b) of FIG. 25, the first attention point Pa1 and the first reference point Pr1 are positioned at the same tire portion, and the luminance difference is, therefore, small. On the other hand, the second to the sixth attention points Pa2 to Pa6 are positioned at the rubber portions of the tire, and the second to sixth reference points Pr2 to Pr6 are positioned at the wheel portion of the tire. Therefore, the luminance difference between the second to the sixth attention points Pa2 to Pa6 and the second to the sixth reference points Pr2 to Pr6 is great. Accordingly, the edge line detection unit 42 is capable of detecting that an edge is present between the second to the sixth attention points Pa2 to Pa6 and the second to the sixth reference points Pr2 to Pr6 where the luminance difference is great.

Specifically, when an edge line is to be detected, the edge line detection unit 42 first assigns an attribute to the $i^{th}$ attention point Pai from the luminance difference between the ith attention point Pai (coordinates (xi, yi)) to the ith reference point Pri (coordinates (xi', yi')) in accordance with formula 1 noted below.

when $I(xi,yi) > I(xi',yi') + t$ $s(xi,yi) = 1$ when $I(xi,yi) < I(xi',yi') - t$ $s(xi\ yi) = -1$ when the above do not hold true;

$s(xi,yi) = 0$       [Formula 1]

In formula 1 above, t represents an edge threshold value, I(xi, yi) represents the luminance value of the ith attention point Pai, and I(xi', yi') represents the luminance value of the ith reference point Pri. In accordance with formula 1, the attribute s(xi, yi) of the attention point Pai is '1' when the luminance value of the attention point Pai is greater than the luminance value obtained by adding the threshold value t to the reference point Pri. On the other hand, the attribute s(xi, yi) of the attention point Pai is '−1' when the luminance value of the attention point Pai is less than the luminance value obtained by subtracting the edge threshold value t from the reference point Pri. The attribute s(xi, yi) of the attention point Pai is '0' when the luminance value of the attention point Pai and the luminance value of the reference point Pri are in a relationship other than that stated above. In the present embodiment, there are cases in which the edge threshold value t is changed by the controller 37a mentioned below; when the edge threshold value t is changed by the controller 37a, the attribute s(xi, yi) of the attention point Pai is detected using the edge threshold value t that is changed by the controller 37a.

Next, the edge line detection unit 42 assesses whether the attention line La is an edge line from the continuity c(xi, yi) of the attribute s along the attention line La based on the following formula 2.

when $s(xi,yi)=s(xi+1,yi+1)$(excluding when 0=0)

$c(xi,yi)=1$ when the above does not hold true.

$c(xi,yi)=0$ [Formula 2]

The continuity c(xi, yi) is '1' when the attribute s(xi, yi) of the attention point Pai and the attribute s(xi+1, yi+1) of the adjacent attention point Pai+1 are the same. The continuity c(xi, yi) is '0' when the attribute s(xi, yi) of the attention point Pai and the attribute s(xi+1, yi+1) of the adjacent attention point Pai+1 are not the same.

Next, the edge line detection unit 42 determines the sum of the continuities c of all of the attention points Pa on the attention line La. The edge line detection unit 42 divides the sum of the continuities c thus determined by the number N of attention points Pa to thereby normalize the continuity c. The edge line detection unit 42 determines the attention line La to be an edge line when the normalized value has exceeded a threshold value θ. The threshold value θ is set in advance by experimentation or by another unit.

In other words, the edge line detection unit 42 determines whether the attention line La is an edge line based on formula 3 noted below. The edge line detection unit 42 then determines whether all of the attention lines La drawn on the detection area A1 are edge lines.

$\Sigma c(xi,yi)/N>\theta$ [Formula 3]

Figure 26:
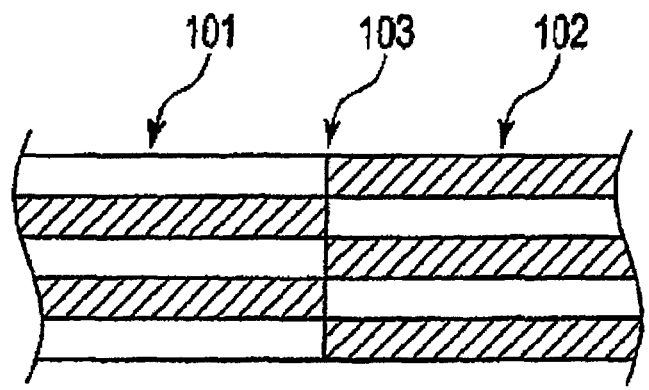
FIG. 26 is a view illustrating an image example that shows an edge detection operation.

In this manner, in the second embodiment, an attribute is assigned to the attention point Pa based on the luminance difference between the attention point Pa on the attention line La and the reference point Pr on the reference line Lr; then, a determination is made regarding whether the attention line La is an edge line based on the continuity c of the attributes along the attention line La. Therefore, the boundaries between the areas having high luminance and the areas having low luminance are detected as edge lines, and the edges can be detected in accordance with the natural senses of a human. The results of the above will be described. FIG. 26 is a view illustrating an image example for describing the operation of the edge line detection unit 42. This image example is an image in which a first stripe pattern 101, indicating a stripe pattern in which the areas of high luminance and the areas of low luminance are repeated, and a second stripe pattern 102, indicating a stripe pattern in which the areas of low luminance and the areas of high luminance are repeated, are adjacent to each other. Also, in this image example, the areas of the first stripe pattern 101 in which the luminance is high and the areas of the second stripe pattern 102 in which the luminance is low are adjacent to each other, and the areas of the first stripe pattern 101 in which the luminance is low and the areas of the second stripe pattern 102 in which the luminance is high are adjacent to each other. The location 103 positioned on the boundary between the first stripe pattern 101 and the second stripe pattern 102 tends not to be perceived as an edge by human senses.

In contrast, because the areas of low luminance and the areas of high luminance are adjacent to each other, the location 103 is recognized as an edge when an edge is detected only by luminance difference. However, in addition to the luminance difference at the location 103, the edge line detection unit 42 assesses the location 103 to be an edge line only when there is continuity in the attributes of the luminance difference. Therefore, the edge line detection unit 42 is capable of suppressing an erroneous assessment in which the location 103, which is not recognized as an edge line by human senses, is recognized as an edge line, and the edges can be detected by human senses.

Returning to FIG. 22, the three-dimensional object detection unit 33a detects a three-dimensional object based on the quantity of edge lines detected by the edge line detection unit 42. As described above, the three-dimensional object detection device 1a according to the present embodiment detects an edge line extending in the perpendicular direction in real space. Detecting many edge lines extending in the perpendicular direction indicates that there is a high possibility that a three-dimensional object is present in the detection areas A1, A2. Accordingly, the three-dimensional object detection unit 33a detects a three-dimensional object based on the quantity of edge lines detected by the edge line detection unit 42. Specifically, the three-dimensional object detection unit 33a determines whether the quantity of edge lines detected by the edge line detection unit 42 is a predetermined threshold value β or greater; when the quantity of edge lines is a predetermined threshold value β or greater, the edge lines detected by the edge line detection unit 42 are determined to be the edge lines of a three-dimensional object.

Furthermore, prior to detecting the three-dimensional object, the three-dimensional object detection unit 33a assesses whether the edge lines have been correctly detected by the edge line detection unit 42. The three-dimensional object detection unit 33a assesses whether a change in luminance on the edge lines is a predetermined threshold value tb or greater along the edge lines of the bird's-eye view image. When the change in luminance on the edge lines in the bird's-eye view image is a predetermined threshold value tb or greater, the edge lines are determined to have been detected by an erroneous assessment. On the other hand, when the change in luminance on the edge lines in the bird's-eye view image is less than a predetermined threshold value tb, a determination is made that the edge lines have been correctly assessed. The threshold value tb is set in advance by experimentation or by another unit.

Figure 27:
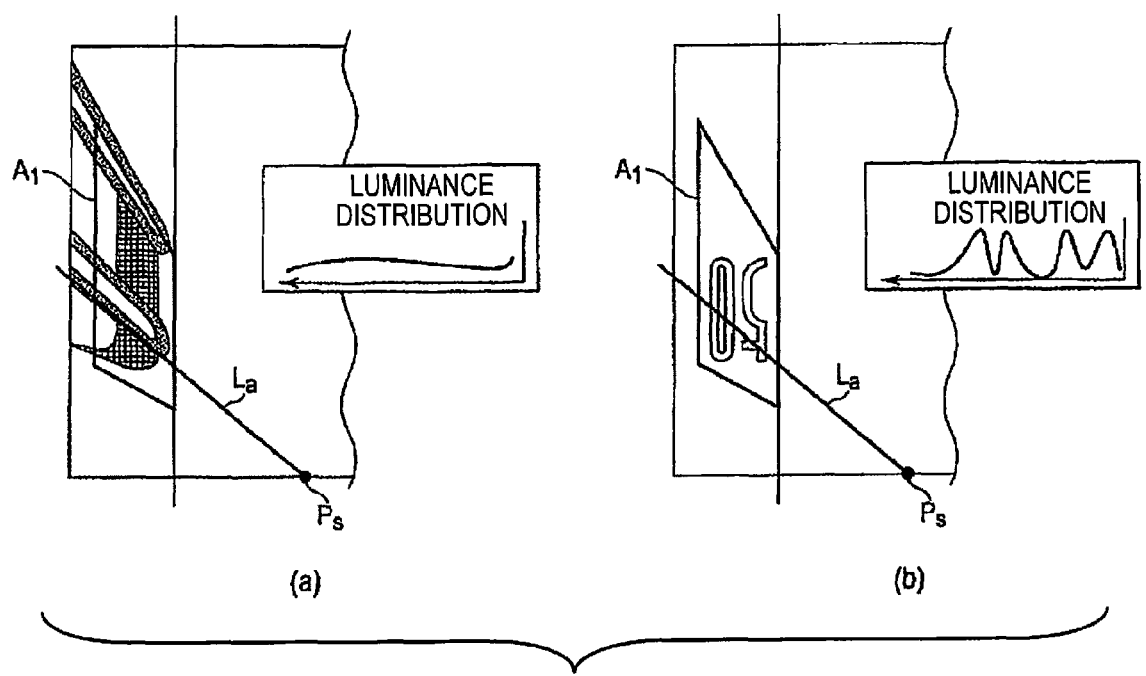
FIG. 27 is a view illustrating the edge line and the luminance distribution on the edge line, with part (a) of FIG. 27 being a view illustrating the luminance distribution when a three-dimensional object (an adjacent vehicle) is present in the detection area, and FIG. 27 being a view illustrating the luminance distribution when a three-dimensional object is not present in the detection area.

FIG. 27 is a view illustrating the luminance distribution on the edge line. Part (a) of FIG. 27 illustrates the edge line and the luminance distribution when an adjacent vehicle V2 as a three-dimensional object is present in the detection area A1, and part (b) of FIG. 27 illustrates the edge line and the luminance distribution when a three-dimensional object is not present in the detection area A1.

As illustrated in part (a) of FIG. 27, an assumption is made that a determination has been made that the attention line La set on the tire rubber portion of the adjacent vehicle V2 in on an edge line in the bird's-eye view image. In this case, the change in luminance on the attention line La in the bird's-eye view image is gradual. This is due to the image captured by the camera 10 being converted from viewpoint into a bird's-eye view image, whereby the tire of the adjacent vehicle is enlarged within the bird's-eye view image. On the other hand, the attention line La set in the white character portion "50" drawn on the road surface in the bird's-eye view image is assumed to have been erroneously assessed to be an edge line, as illustrated in part (b) of FIG. 27. In this case, the change in luminance on the attention line La in the bird's-eye view image has considerable undulations. This is because the road and other portions of low luminance are mixed with the portions of high luminance in the white characters on the edge line.

The three-dimensional object assessment unit 34a assesses whether an edge line has been detected by an erroneous assessment based on the differences in the luminance distribution on the attention line La as described above. For example, a three-dimensional object included in a captured image tends to appear in an enlarged state in a bird's-eye view image when the captured image acquired by the camera 10 is converted into a bird's-eye view image. As described above, when the tire of an adjacent vehicle V2 is enlarged, changes in the luminance of the bird's-eye view image in the enlarged direction tend to be small because the tire as a single location is enlarged. In contrast, when a character or the like drawn on the road surface has been erroneously assessed to be an edge line, areas such as the character portion having a high luminance and areas such as the road surface portion having a low luminance are included in the bird's-eye view image in an intermixed fashion. In such a case, changes in the luminance in the enlarged direction tend to be greater. Accordingly, the three-dimensional object detection unit 33a determines that the edge line has been detected by an erroneous assessment when the change in luminance along the edge line is at a predetermined threshold value tb or greater and determines that the edge line is not caused by a three-dimensional object. A reduction in the precision for detecting a three-dimensional object is thereby suppressed when white characters such as "50" on the road surface, roadside vegetation, and the like are assessed to be edge lines. On the other hand, the three-dimensional object detection unit 33a determines that an edge line is the edge line of a three-dimensional object and determines that a three-dimensional object is present when changes in luminance along the edge line are less than a predetermined threshold value tb.

Specifically, the three-dimensional object detection unit 33a calculates the change in luminance of the edge line using formula 4 or 5 noted below. The change in luminance of the edge line corresponds to the evaluation value in real space in the perpendicular direction. Formula 4 evaluates the luminance distribution using the total value of the square of the difference between the ith luminance value I(xi, yi) and the adjacent ith+1 luminance value I(xi+1, yi+1) on the attention line La. Formula 5 evaluates the luminance distribution using the total value of the absolute value of the difference between the ith luminance value I(xi, yi) and the adjacent ith+1 luminance value I(xi+1, yi+1) on the attention line La.

Evaluation value in the perpendicular equivalent direction=$\Sigma[\{I(xi,yi)-I(xi+1,yi+1)\}^2]$ [Formula 4]

Evaluation value in the perpendicular equivalent direction=$\Sigma|I(xi,yi)-I(xi+1,yi+1)|$ [Formula 5]

No limitation is imposed in the use of formula 5, and binarizing an attribute b of an adjacent luminance value using a threshold value t2 and then adding the binarized attribute b for all of the attention points Pa, as in formula 6 noted below, are also possible.

Evaluation value in the perpendicular equivalent direction=$\Sigma b(xi,yi)$ where $b(xi,yi)=1$ when $|I(xi,yi)-I(xi+1,yi+1)|>t2$ $b(xi,yi)=1$ when the above does not hold true.

$b(xi,yi)=0$ [Formula 6]

The attribute b(xi, yi) of the attention point Pa(xi, yi) is '1' when the absolute value of the luminance difference between the luminance value of the attention point Pai and the luminance value of the reference point Pri is greater than a threshold value t2. When the above relationship does not hold true, the attribute b(xi, yi) of the attention point Pai is '0.' The threshold value t2 is set in advance by experimentation or by another unit so that the attention line La is not assessed to be on the same three-dimensional object. The three-dimensional object detection unit 33a then adds the attribute b for all of the attention points Pa on the attention line La and determines the evaluation value in the perpendicular equivalent direction in order to thereby assess whether an edge line is related to a three-dimensional object and whether a three-dimensional object is present.

The controller 37a controls the detection of a three-dimensional object by the three-dimensional object detection unit 33a. Specifically, the controller 37a suppresses the detection of a three-dimensional object by changing the edge threshold value t mentioned above to a high value or by prohibiting the detection of a three-dimensional object in the areas within the detection areas A1, A2 in which the specific luminance peaks are detected, based on the number of the specific luminance peaks that are detected by the specific luminance peak detection unit 36 and the magnitude of the luminance value.

Additionally, when suppressing the detection of a three-dimensional object by the three-dimensional object detection unit 33, the controller 37 obtains the turbidity of the lens from the turbidity calculation unit 38 and decreases the suppression degree when suppressing the detection of a three-dimensional object in the case that the lens of the camera 10 is clouded. When a speculation has been made that water film has formed on the road surface by the road surface state estimation unit 39, the controller 37 increases the suppression degree when suppressing the detection of a three-dimensional object. The controller 37 prohibits the suppression of detecting a three-dimensional object when the headlight of an adjacent vehicle V2 is detected by the headlight detection unit 40.

Figure 28:
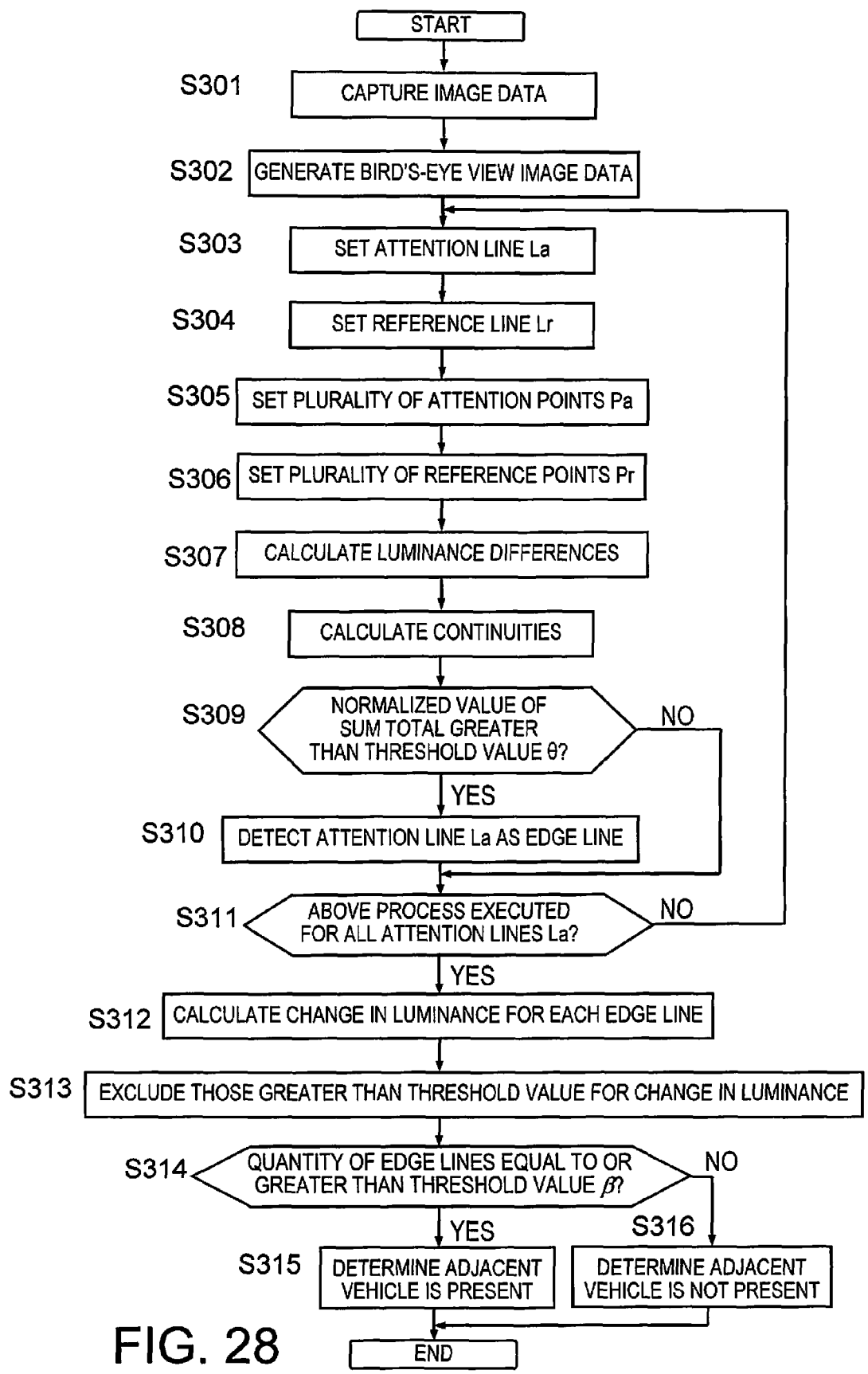
FIG. 28 is a flowchart illustrating the method for detecting an adjacent vehicle according to the second embodiment.

Next, the method for detecting an adjacent vehicle according to the second embodiment will be described with reference to FIG. 28. FIG. 28 is a flowchart illustrating the details of the method for detecting an adjacent vehicle according to the second embodiment. In FIG. 28, the operation associated with detection area A1 will be described for the sake of convenience, but the same process is also executed for detection area A2.

In Step S301, a predetermined area specified by the view angle a and the attachment position is captured by the camera 10, and the image data of the captured image P captured by the camera 10 is acquired by the computer 30a. Next, the viewpoint conversion unit 31 converts the viewpoint of the acquired image data and generates the bird's-eye view image data in Step S302.

Next, in Step S303, the luminance difference calculation unit 41 sets the attention line La on the detection area A1. At this time, the luminance difference calculation unit 41 sets a line corresponding to a line extending in the perpendicular direction in real space as the attention line La. Then, in Step S304, the luminance difference calculation unit 41 sets the reference line Lr on the detection area A1. The luminance difference calculation unit 41 sets, as the reference line Lr, a line that corresponds to a line extending in the perpendicular direction in real space and a line that is separated by a predetermined distance in real space from the attention line La.

Next, the luminance difference calculation unit 41 sets a plurality of attention points Pa on the attention line La in Step S305. At this time, the luminance difference calculation unit 41 sets a certain number of attention points Pa that will not be problematic during edge detection by the edge line detection unit 42. The luminance difference calculation unit 41 subsequently sets the reference points Pr so that the attention points Pa and the reference points Pr have the same height in real space in Step 306. The attention points Pa and the reference points Pr thereby substantially line up in the horizontal direction, and the edge line extending in the perpendicular direction in real space is more readily detected.

Next, in Step S307, the luminance difference calculation unit 41 calculates the luminance difference between the attention points Pa and the reference points Pr at the same height in real space. The edge line detection unit 42 then calculates the attribute s of each attention point Pa based on the luminance difference calculated by the luminance difference calculation unit 41 in accordance with formula 1 described above. In the present embodiment, the attribute s of each attention point Pa is calculated using the edge threshold value t for detecting the edges of a three-dimensional object. This edge threshold value t may be changed in the three-dimensional object detection control process mentioned below; in the case that the edge threshold value t is changed, the changed edge threshold value would be used in this Step S307. Additionally, in the three-dimensional object detection control process mentioned below, there are cases in which the detection of a three-dimensional object is prohibited in the pixel area within the detection areas A1, A2 in which a specific luminance peak has been detected; in this case, the pixel values of the difference image PDt in the area in which the detection of a three-dimensional object is prohibited will be calculated as "0," thereby prohibiting the detection of a three-dimensional object.

In Step S308, the edge line detection unit 42 then calculates the continuity c of the attribute s of the attention points Pa in accordance with formula 2 described above. In Step S309, the edge line detection unit 36 further assesses whether a value obtained by normalizing the sum of the continuity c is greater than a threshold value $\theta$ in accordance with formula 3. When a determination has been made that the normalized value is greater than the threshold value $\theta$ (Step S309=Yes), the edge line detection unit 42 detects the attention line La as the edge line in Step S310. The operation then proceeds to Step S311. When a determination has been made that the normalized value is not greater than the threshold value $\theta$ (Step S309=No), the edge line detection unit 42 does not detect that the attention line La is an edge line, and the operation proceeds to Step S311.

In Step S311, the computer 30a determines whether the operations of Steps S303 to S310 have been executed for all of the attention lines La that can be set on the detection area A1. When a determination has been made that the above operations have not been carried out for all of the attention lines La (Step S311=No), the operation returns to Step S303, sets a new attention line La, and repeats the operation through Step S311. On the other hand, when a determination has been made that the operations have been carried out for all the attention lines La (Step S311=Yes), the operation proceeds to Step S312.

In Step S312, the three-dimensional object detection unit 33a calculates the change in luminance along the edge line for each edge line detected in Step S310. The three-dimensional object detection unit 33a calculates the change in luminance of the edge lines in accordance with any of formulas 4, 5, and 6. Next, in Step S313, the three-dimensional object detection unit 33a excludes, from among the edge lines, the edge lines for which the change in luminance is at a predetermined threshold value tb or greater. In other words, when an edge line having a large change in luminance is not assessed to be a correct edge line, the edge line is not used for detecting a three-dimensional object. As described above, this is done in order to suppress the detection of characters on the road surface, roadside vegetation, and the like included in the detection area A1 as edge lines. Therefore, the predetermined threshold value tb is determined by experimentation or by another unit in advance and is set based on the change in luminance that occurs due to the characters on the road surface, roadside vegetation, and the like. On the other hand, the three-dimensional object detection unit 33a determines an edge line having a change in luminance that is less than a predetermined threshold value tb to be an edge line of a three-dimensional object, thereby detecting the three-dimensional object present in an adjacent lane.

Next, in Step S314, a determination is made by the three-dimensional object assessment unit 33a as to whether the quantity of edge lines is a threshold value $\beta$ or higher. Here, the second threshold value $\beta$ is set in advance by experimentation or by another unit; for example, when a four-wheel vehicle is set as the three-dimensional object to be detected, the threshold value $\beta$ is set based on the number of edge lines of a four-wheel vehicle that appeared in the detection area A1. When the determination is such that the quantity of edge lines is at the threshold value $\beta$ or greater (Step S314=Yes), the three-dimensional object detection unit 33a determines that a three-dimensional object is present in the detection area A1, the operation proceeds to Step S315, and a determination is made that an adjacent vehicle is present. On the other hand, when the determination is such that the quantity of edge lines is not at the threshold value $\beta$ or greater (Step S314=No), the three-dimensional object detection unit 33a determines that a three-dimensional object is not present in the detection area A1, the operation proceeds to Step S316, and a determination is made that an adjacent vehicle is not present within the detection area A1.

The three-dimensional object detection control process illustrated in FIG. 21 is executed in parallel with the adjacent vehicle detection process illustrated in FIG. 28 in the second embodiment in the same way as in the first embodiment. The detection of a three-dimensional object is thereby carried out in the adjacent vehicle detection process illustrated in FIG. 28 in accordance with the control of this three-dimensional object detection control process. In the second embodiment, the three-dimensional object detection control process illustrated in FIG. 21 is the same operation as the three-dimensional object detection control process according to the first embodiment except for the point that the edge threshold value t is changed in lieu of changing the differential threshold value th; therefore, this description has been omitted.

As described above, in the second embodiment, effectively preventing an erroneous detection of a light source, such as a street light reflected on the road surface, as a three-dimensional object when detecting the edges of a subject in the detection areas A1, A2 and detecting an adjacent vehicle V2 based on the edges is possible by detecting a peak in the luminance caused by a light source, such as a street light reflected on the road surface, as a specific luminance peak and by suppressing the detection of a three-dimensional object in areas within the detection areas A1, A2 in which the specific luminance peaks are detected.

The embodiments described above have been described in order to facilitate an understanding of the present invention, and they are not described in order to limit the present invention. Therefore, the elements disclosed in the embodiments above are intended to include all design modifications and equivalents thereto that lie within the technical range of the present invention.

For example, in the embodiments described above, an example configuration was provided in which the differential threshold value th or the edge threshold value t was changed according to the magnitude of the luminance value of the specific luminance peaks when the number of specific luminance peaks was a predetermined first assessment number or more and less than a second assessment number, as illustrated in FIG. 16; however, no limitation has been imposed thereby; for example, using a configuration in which the values of the threshold value α and the threshold value β for detecting a three-dimensional are changed, in lieu of the differential threshold value th and the edge threshold value t or in addition to the differential threshold value th and the edge threshold value t, is also possible. Alternatively, using a configuration in which the threshold value θ and the threshold value t2 for detecting the edge lines are changed or a configuration in which the threshold value tb is changed is also possible. Additionally, using a configuration in which the pixel value or the luminance value that has been output from each pixel decreases according to the magnitude of the luminance value of the specific luminance peaks, when the number of specific luminance peaks is a predetermined first assessment number or more and is less than a second assessment number, is also possible. In this case, suppressing the detection of a three-dimensional object, based on the specific luminance peak, even when the differential threshold value th or the edge threshold value t have not been changed, is possible.

In the embodiments described above, an example configuration was provided in which a three-dimensional object is detected as an adjacent vehicle V2 when the traveling speed of the three-dimensional object satisfies a predetermined condition; however, no limitation is imposed thereby; for example, using a configuration in which the detection of an adjacent vehicle V2 is suppressed by changing the condition mentioned above based on the specific luminance peak is also possible. For example, in the embodiments described above, a three-dimensional object is determined to be an adjacent vehicle V2 when the absolute traveling speed of the three-dimensional object is 10 km/h or more and the relative traveling speed of the three-dimensional object in relation to the host vehicle V1 is +60 km/h or less; however, in a region in which a specific luminance peak is detected, a three-dimensional object may be determined to be an adjacent vehicle V2 when, for example, the absolute traveling speed of the three-dimensional object is 20 km/h or more and the relative traveling speed of the three-dimensional object in relation to the host vehicle V1 is +50 km/h or less.

In the embodiments described above, an example configuration was provided in which the detection of a three-dimensional object is suppressed only in the area within the detection areas A1, A2 in which a specific luminance peak is detected when controlling (suppressing) the detection of a three-dimensional object by the three-dimensional object detection unit 33 based on the result of detecting a specific luminance peak; however, no limitation is imposed thereby; for example, using a configuration in which the detection of a three-dimensional object is controlled (suppressed) for the entire detection areas A1, A2, based on the result of detecting a specific luminance peak, is also possible. In this case, using a configuration in which the detection of a specific luminance peak is carried out separately for the detection areas A1, A2 and in which the detection of a three-dimensional object is controlled (suppressed) only in the detection areas in which the specific luminance peaks are detected is preferable.

In the embodiments described above, an example configuration was provided in which, the detection of a three-dimensional object by the three-dimensional object detection unit 33 is prohibited in the area in which specific luminance peaks are detected when the number of the specific luminance peaks is a predetermined second assessment number or greater; however, no limitation is imposed thereby; for example, using a configuration in which the detection of a three-dimensional object by the three-dimensional object detection unit 33 is prohibited in the area in which a specific luminance peak is detected when even just one specific luminance peak of high luminance is detected is also possible.

In addition to the embodiments described above, using a configuration in which the absolute values of the amounts of change in the luminance gradient in the second derivative histogram is averaged is also possible; when the average value exceeds a predetermined reference value, a determination is made that many peaks in the luminance by a light source, such as a street light reflected on the road surface, are present, and the detection of a three-dimensional object by the three-dimensional object detection unit 33 is suppressed.

In the embodiments described above, an example configuration was provided in which controlling the detection of a three-dimensional object based on the specific luminance peak is prohibited only for a predetermined period of time when an adjacent vehicle V2 is being detected; however, no limitation is imposed thereby; using a configuration in which the detection of a specific luminance peak is suppressed only for a predetermined period of time when an adjacent vehicle V2 is being detected is also possible. For example, using a configuration in which the suppression degree for suppressing the detection of a three-dimensional object is reduced is possible by changing the first change amount or the second change amount for detecting a specific luminance peak to a high value for a predetermined period of time when an adjacent vehicle V2 is being detected. In the embodiments described above, an example configuration was provided in which a determination is made regarding whether or not an adjacent vehicle V2 is being detected by determining whether or not a three-dimensional object is an adjacent vehicle V2 that is overtaking the host vehicle V1, based on the relative traveling speed of the host vehicle V1 in relation to the three-dimensional object; however, no limitation is imposed thereby; using a configuration in which a determination is made regarding whether or not a three-dimensional object is an adjacent vehicle V2 that is overtaking the host vehicle V1 is also possible by comparing the relative traveling speed of the three-dimensional object in relation to the host vehicle V1 or by comparing the absolute traveling speed of the three-dimensional object with the absolute traveling speed of the host vehicle V1, thereby determining whether or not an adjacent vehicle V2 is being detected.

In addition to the embodiments described above, using a configuration in which a road surface reflection from the setting sun is detected, based on the first derivative histogram, and the detection of a three-dimensional object is suppressed in the area in which a road surface reflection from the setting sun is being generated is also possible. Here, when the setting sun is illuminating the road surface, there are cases in which the peaks in the luminance with a large luminance gradient are detected in one to two places in the same way as when a light source, such as a street light, is being reflected on the road surface. However, in the case of the setting sun, unlike with a light source, such as a street light, the setting sun will be detected in the same position on the road surface even after a period of time has elapsed; therefore, a peak caused by the setting sun will not be detected when the difference between the current luminance histogram and the luminance histogram at a single moment prior is formed into a first derivative histogram. The controller 37 is able to detect an area within the detection areas A1, A2 in which the setting sun is illuminating the road surface by detecting this type of luminance peak.

In the embodiments described above, an example configuration was provided in which the suppression degree when suppressing the detection of a three-dimensional object is increased when a speculation is made that water film has formed on the road surface by the road surface state estimation unit 39; however, no limitation is imposed thereby; for example, using a configuration in which the detection of a headlight of an adjacent vehicle V2 by the headlight detection unit 40 is suppressed when a speculation is made that water film has formed on the road surface by the road surface state estimation unit 39 is also possible. For example, using a configuration in which, when the headlight detection unit 40 detects a high luminance area of a predetermined area or more as a light source corresponding to the headlight of an adjacent vehicle V2, the detection of a headlight of an adjacent vehicle V2 by the headlight detection unit 40 is suppressed by increasing the predetermined area described above is possible when a speculation has been made that water film has formed on the road surface by the road surface state estimation unit 39. Alternatively, using a configuration in which the detection of a headlight of an adjacent vehicle V2 by the headlight detection unit 40 is suppressed by limiting the target area of detection corresponding to the headlight of an adjacent vehicle V2 to the area corresponding to the adjacent lane is possible when a speculation has been made that water film has formed on the road surface by the road surface state estimation unit 39. Additionally, there is the possibility of using a configuration in which, when the headlight detection unit 40 detects an area of a predetermined area or more, having a luminance difference with the surrounding of a predetermined luminance difference or more as a light source corresponding to the headlight of an adjacent vehicle V2, the detection of a headlight of an adjacent vehicle V2 by the headlight detection unit 40 is suppressed by calculating the traveling speed of the light source, based on the change in time of the light source, and by increasing the luminance difference and the area mentioned above for a light source with a slow traveling speed in relation to the host vehicle V1 and that is moving away behind the host vehicle V1. Accordingly, suppressing the detection of a light source corresponding to a headlight of an adjacent vehicle V2 when water film has formed on the road surface and when a light source, such as a street light reflected on the road surface, is easily detected is possible; as a result, suppressing the detection of a three-dimensional object is possible; thus, effectively preventing the erroneous detection of a light source, such as a street light reflected on the road surface, as a three-dimensional object is possible.

The camera 10 in the embodiments described above corresponds to the image capturing unit of the present invention. The viewpoint conversion unit 31 corresponds to the image conversion means of the present invention; the alignment unit 32, the three-dimensional object detection units 33, 33a, the luminance difference calculation unit 41, and the edge line detection unit 42 correspond to the three-dimensional object detection means of the present invention. The nighttime assessment unit 34 corresponds to the nighttime assessment means of the present invention; the luminance difference calculation unit 35 corresponds to the luminance difference calculation means of the present invention; the specific luminance peak detection unit 36 corresponds to the specific luminance peak detection means of the present invention; the controllers 37, 37a correspond to the control means of the present invention; the turbidity calculation unit 38 corresponds to the lens state assessment means of the present invention; the three-dimensional object detection units 33, 33a correspond to the traveling speed acquisition means and the three-dimensional object assessment means of the present invention; the road surface state estimation unit 39 corresponds to the road surface state estimation means of the present invention; and the headlight detection unit 40 corresponds to the light source detection means of the present invention.

The invention claimed is:

1. A three-dimensional object detection device comprising:
   an image capturing device mounted on a host vehicle, and comprising a lens for capturing images behind the host vehicle;
   a three-dimensional object detection unit programmed to detect a presence of a three-dimensional object in a detection area based on captured images acquired by the image capturing unit; and
   a nighttime assessment unit programmed to assess whether or not nighttime has fallen;
   a luminance detection unit programmed to detect a luminance of a plurality of image areas based on the captured image;
   a luminance peak detection unit programmed to detect a peak in the luminance having a luminance gradient that is greater than or equal to a predetermined reference value from among the peaks in the luminance detected by the luminance detection unit as a target luminance peak; and
   a controller programmed to control detection of the three-dimensional object by the three-dimensional object detection unit in an image area in which the target luminance peak is detected when an assessment has been made that nighttime has fallen by the nighttime assessment unit.

2. The three-dimensional object detection device according to claim 1, wherein
   the controller is further programmed to suppress the detection of the three-dimensional object by the three-dimensional object detection unit in an image area in which the target luminance peak is detected by prohibiting the detection of the three-dimensional object by the three-dimensional object detection unit.

3. The three-dimensional object detection device according to claim 1, wherein
the controller is further programmed to suppress the detection of the three-dimensional object by the three-dimensional object detection unit based on at least one of the number of the target luminance peaks and the magnitude of the luminance values of the target luminance peaks.

4. The three-dimensional object detection device according to claim 1, further comprising:
a lens state assessment unit programmed to assess a degree of pollution of the lens based on the captured images,
the controller being further programmed to set the suppression degree to be higher when suppressing the detection of the three-dimensional object with higher amounts of pollution by promoting the detection of the target luminance peak by the luminance peak detection unit.

5. The three-dimensional object detection device according to claim 1, further comprising:
a traveling speed acquisition unit programmed to acquire the traveling speed of the three-dimensional object and the traveling speed of a host vehicle; and
a three-dimensional object assessment unit programmed to determine whether or not the three-dimensional object is another vehicle based on the traveling speed of the three-dimensional object and the traveling speed of the host vehicle; wherein
the controller being further programmed to decrease the suppression degree when suppressing the detection of the three-dimensional object when the three-dimensional object is determined to be another vehicle VX by the three-dimensional object assessment unit.

6. The three-dimensional object detection device according to claim 1, further comprising:
a light source detection unit programmed to detect an image area having a luminance difference with a surrounding of equal to or greater than a predetermined luminance difference and having a size that is equal to or greater than a predetermined area as a light source corresponding to the headlight of another vehicle;
the controller being further programmed to decrease the suppression degree when suppressing the detection of the three-dimensional object by the three-dimensional object detection unit when the light source is detected.

7. The three-dimensional object detection device according to claim 6, further comprising:
a road surface state estimation unit programmed to estimate whether or not a road surface state is such that a water film has formed on a road surface; wherein
the controller being further programmed to suppress the detection of a light source corresponding to a headlight of another vehicle by the light source detection unit when a speculation has been made by the road surface state estimation unit that the road surface state is such that the water film has formed on the road surface.

8. The three-dimensional object detection device according to claim 1, further comprising:
a road surface state estimation unit programmed to estimate whether or not a water film has formed on a road surface;
the controller being further programmed to increase the suppression degree when suppressing the detection of the three-dimensional object when a speculation has been made by the road surface state estimation unit that a road surface state is such that the water film has formed on the road surface by promoting the detection of the target luminance peak by the luminance peak detection unit.

9. The three-dimensional object detection device according to claim 8, wherein
the road surface state estimation unit is further programmed to estimate whether or not the road surface state is such that the water film has formed on the road surface by assessing whether or not rain is falling in the host vehicle's surroundings based on an operating state of a wiper.

10. The three-dimensional object detection device according to claim 8, wherein
the road surface state estimation unit is further programmed to estimate that the road surface state is such that the water film has formed on the road surface when an operating state of a wiper is changed from a high operation frequency state to a low operation frequency state.

11. The three-dimensional object detection device according to claim 8, wherein
the road surface state estimation unit is further programmed to specify one assessment line out of a plurality of assessment lines along a direction in which a three-dimensional object collapses when the viewpoint of the captured images are converted to the bird's-eye view images as the reference assessment line; when the luminance difference between the luminance of an image area on the reference line and the luminance of an image area on one or a plurality of comparative assessment lines, including the assessment lines that are adjacent to the reference assessment line, is less than a predetermined value, the road surface state estimation unit estimates that the road surface state is such that the water film has formed on the road surface.

12. A three-dimensional object detection device comprising:
an image capturing device mounted on a host vehicle, and comprising a lens for capturing images behind the host vehicle;
an image conversion unit programmed to perform viewpoint conversion of the captured images obtained by the image capturing device into bird's-eye view images;
the three-dimensional object detection unit being programmed to detect a presence of a three-dimensional object based on differential waveform information in which the differential waveform information is generated by aligning in bird's-eye view positions of the bird's-eye view images obtained at different times by the image conversion device, and counting a number of pixels that indicate a predetermined difference in a difference image of aligned bird's-eye view images to form a frequency distribution;
a nighttime assessment unit programmed to assess whether or not nighttime has fallen;
a luminance detection unit programmed to detect a luminance of a plurality of image areas based on the captured images;
a luminance peak detection unit programmed to detect a peak in the luminance having a luminance gradient that is greater than or equal to a predetermined reference value from among the peaks in the luminance detected by the luminance detection unit as a target luminance peak; and a controller programmed to control detection of the three-dimensional object by the three-dimensional object detection unit in an image area in which the target luminance peak is detected when an assessment has been made that nighttime has fallen by the nighttime assessment unit.

13. The three-dimensional object detection device according to claim 12, wherein
the three-dimensional object detection unit is further programmed to generate the differential waveform information by counting a number of pixels that indicate a difference of equal to or greater than a predetermined first threshold value to form the frequency distribution, and three-dimensional object detection unit detects the three-dimensional object on the difference image of the bird's-eye view image based on the differential waveform when the peak value of the differential waveform information is equal to or greater than a predetermined second threshold value; and
the controller is further programmed to suppress the detection of the three-dimensional object by the three-dimensional object detection unit based on a result of detecting the target luminance peak by changing one of the first threshold value and the second threshold value to a higher value.

14. The three-dimensional object detection device according to claim 12, wherein
when the three-dimensional object detection unit generates the differential waveform information, the controller is further programmed to cause the three-dimensional object detection unit to calculate the value obtained by counting a number of pixels that indicate the predetermined difference in the difference image of the bird's-eye view images to form the frequency distribution to lower, thereby suppressing the detection of the three-dimensional object by the three-dimensional object detection unit.

15. A three-dimensional object detection device comprising:
an image capturing device mounted on a host vehicle, and comprising a lens for capturing images behind the vehicle;
an image conversion unit programmed to perform viewpoint conversion of the captured images obtained by the image capturing device into bird's-eye view images;
the three-dimensional object detection unit programmed to detect a presence of a three-dimensional object based on edge information that is detected from the bird's-eye view images obtained by the image conversion unit;
a nighttime assessment unit programmed to assess whether or not nighttime has fallen;
a luminance detection unit programmed to detect a luminance of a plurality of image areas based on the captured images;
a luminance peak detection unit programmed to detect a peak in the luminance having a luminance gradient that is greater than or equal to a predetermined reference value from among the peaks in the luminance detected by the luminance detection unit as a target luminance peak; and
a controller programmed to control detection of the three-dimensional object by the three-dimensional object detection unit in an image area in which the target luminance peak is detected when an assessment has been made that nighttime has fallen by the nighttime assessment unit.

16. The three-dimensional object detection device according to claim 15, wherein
the three-dimensional object detection unit is further programmed to detect edge components that have a luminance difference between adjacent pixel areas of equal to or greater than a predetermined first threshold value based on the bird's-eye view images and to detect the three-dimensional object based on the edge information when a quantity of the edge information based on the edge components is equal to or greater than a predetermined second threshold value; and
the controller is further programmed to suppress the detection of the three-dimensional object by the three-dimensional object detection unit based on a result of detecting the target luminance peak by changing one of the first threshold value and the second threshold value to a higher value.

17. The three-dimensional object detection device according to claim 15, wherein
the controller is further programmed to suppress the detection of the three-dimensional object by the three-dimensional object detection unit when the three-dimensional object detection unit detects the edge information by causing the three-dimensional object detection unit to output the edge information as low.

18. A three-dimensional object detection method comprising:
converting viewpoints of captured images into bird's-eye view images;
aligning positions of the bird's-eye view images that are obtained at different times in a bird's-eye view;
generating differential waveform information by counting a number of pixels that indicate a predetermined difference in a difference image of aligned bird's-eye view images to form a frequency distribution;
detecting a presence of a three-dimensional object based on the differential waveform information;
determining whether or not nighttime has fallen;
detecting a luminance in a plurality of image areas based on the captured images;
detecting a peak in the luminance having a luminance gradient of a predetermined value or more, from among the detected peaks in the luminance, as a target luminance peak; and
suppressing the detection of the three-dimensional object in an image area in which the target luminance peak is detected when an assessment has been made that nighttime has fallen.

19. A three-dimensional object detection method comprising:
converting viewpoints of captured images into bird's-eye view images;
detecting edge information from the bird's-eye view images; and
detecting a presence of a three-dimensional object based on the edge information;
determining whether or not nighttime has fallen;
detecting a luminance in a plurality of image areas based on the captured images;
detecting a peak in the luminance having a luminance gradient of a predetermined value or more, from among the detected peaks in the luminance, as a target luminance peak; and
suppressing the detection of the three-dimensional object in an image area in which the target luminance peak is detected when an assessment has been made that nighttime has fallen.

* * * * *